(12) United States Patent
Jang et al.

(10) Patent No.: US 9,479,744 B2
(45) Date of Patent: Oct. 25, 2016

(54) IMAGE SIGNAL PROCESSOR AND MOBILE DEVICE INCLUDING IMAGE SIGNAL PROCESSOR

(71) Applicant: SAMSUNG ELECTRONICS CO., LTD., Suwon-si, Gyeonggi-do (KR)

(72) Inventors: Yun-Seong Jang, Yongin-si (KR); Jongseong Choi, Hwaseong-si (KR); Juhyun Cho, Suwon-si (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 248 days.

(21) Appl. No.: 14/079,063

(22) Filed: Nov. 13, 2013

(65) Prior Publication Data
US 2014/0139706 A1 May 22, 2014

(30) Foreign Application Priority Data
Nov. 22, 2012 (KR) .................. 10-2012-0133196

(51) Int. Cl.
*H04N 9/04* (2006.01)
(52) U.S. Cl.
CPC .................. *H04N 9/045* (2013.01)
(58) Field of Classification Search
CPC .................. H04N 9/045
See application file for complete search history.

(56) References Cited

U.S. PATENT DOCUMENTS

| | | | |
|---|---|---|---|
| 6,819,804 B2 | 11/2004 | Tenze et al. | |
| 6,906,747 B2 | 6/2005 | Okada | |
| 7,643,699 B2 | 1/2010 | Lim et al. | |
| 7,916,189 B2 | 3/2011 | Ikeda | |
| 7,957,588 B2 | 6/2011 | Ishiga | |
| 7,983,511 B1 | 7/2011 | Chan | |
| 8,036,457 B2 | 10/2011 | Matsushita et al. | |
| 8,059,910 B2 | 11/2011 | Ishiga | |
| 8,154,629 B2 | 4/2012 | Kanemitsu et al. | |
| 8,155,472 B2 | 4/2012 | Utsugi | |
| 8,175,378 B2 | 5/2012 | Aldrich et al. | |
| 8,194,984 B2 | 6/2012 | Seki et al. | |
| 8,310,567 B2 | 11/2012 | Kim et al. | |
| 2004/0233324 A1* | 11/2004 | Galambos | H04N 5/232 348/372 |
| 2006/0050980 A1* | 3/2006 | Kohashi | G06T 5/002 382/254 |
| 2006/0152612 A1* | 7/2006 | Asada | H04N 5/23293 348/333.01 |
| 2008/0143881 A1* | 6/2008 | Tsukioka | G06T 5/20 348/631 |

(Continued)

FOREIGN PATENT DOCUMENTS

| | | |
|---|---|---|
| KR | 1020090026449 | 3/2009 |
| KR | 1020110048922 | 5/2011 |

*Primary Examiner* — Roberto Velez
*Assistant Examiner* — Tuan Le
(74) *Attorney, Agent, or Firm* — F. Chau & Associates, LLC

(57) ABSTRACT

An image signal processor receives a Bayer image signal from an image sensor and converts the Bayer image signal into a normal image signal. The image signal processor includes a memory configured to store a table including reference brightness values and variation values according to the reference brightness values; a shot noise cancelation unit configured to calculate a reference brightness value of the Bayer image signal, select a variation value in the table of the memory according to the calculated reference brightness value, and perform shot noise cancelling on the Bayer image signal based on the selected variation value to generate a modified Bayer image signal; and an interpolation unit configured to generate the normal image signal by performing interpolation based on the modified Bayer image signal.

13 Claims, 17 Drawing Sheets

(56) References Cited

U.S. PATENT DOCUMENTS

2008/0175510 A1 7/2008 Matsushita
2009/0066790 A1* 3/2009 Hammadou ..... G08B 13/19636
348/143
2012/0086838 A1 4/2012 Ovsiannikov
2012/0281136 A1* 11/2012 Takebayashi .......... H04N 9/045
348/441
2013/0064448 A1* 3/2013 Tomaselli ............... G06T 5/002
382/167

* cited by examiner

IMAGE SIGNAL PROCESSOR AND MOBILE DEVICE INCLUDING IMAGE SIGNAL PROCESSOR

CROSS-REFERENCE TO RELATED APPLICATIONS

This application claims priority under 35 U.S.C. §119 to Korean Patent Application No. 10-2012-0133196, filed Nov. 22, 2012, in the Korean Intellectual Property Office, the disclosure of which is incorporated by reference herein.

BACKGROUND

1. Technical Field

Exemplary embodiments of the inventive concept described herein relate to an image processing device, and more particularly, relate to an image signal processor and a mobile device including the image signal processor.

2. Discussion of Related Art

Many processing techniques for processing content and devices to process content have been developed. Examples of this content may include images, voice data, text, etc. Images are a means for visually transferring information to users, and may have higher communicability as compared with text or voice data.

An image capture device may capture an image using a digital image sensor. However, the quality of the digital image sensor may be restricted by structural and cost limits, and the image signals output by the device may include noise.

SUMMARY

According to an exemplary embodiment of the inventive concept, an image signal processor receives a Bayer image signal from an image sensor and converts the Bayer image signal into a normal image signal. The image signal processor includes a memory configured to store a table including reference brightness values and variation values according to the reference brightness values; a first noise reduction unit (e.g., a shot noise cancelation unit) configured to calculate a reference brightness value from the Bayer image signal, select a variation value in the table of the memory according to the calculated reference brightness value, and perform shot noise cancelling on the Bayer image signal based on the selected variation value to generate a modified Bayer image signal; and an interpolation unit configured to generate the normal image signal by performing interpolation based on the modified Bayer image signal.

In an exemplary embodiment, the shot noise cancelation unit is further configured to calculate an adaptive threshold value using a reference threshold value and the selected variation value and to perform the shot noise cancelling on the Bayer image signal based on the adaptive threshold value.

In an exemplary embodiment, the shot noise cancelation unit is further configured to calculate a flatness of the Bayer image signal, to compare the flatness with the adaptive threshold value, and to perform the shot noise canceling on the Bayer image signal based on the comparison result.

In an exemplary embodiment, the shot noise cancelation unit is further configured to apply a strong low pass filter to the Bayer image signal when the flatness is less than the adaptive threshold value and a weak low pass filter to the Bayer image signal when the flatness is greater than the adaptive threshold value.

In an exemplary embodiment, the image signal processor further comprises a pixel correction unit (e.g., bad pixel correction unit) configured to receive the Bayer image signal from the image sensor, to perform a correction (e.g., bad pixel correction) on a pixel of the Bayer image signal to generate a corrected Bayer image signal, and to provide the shot noise cancelation unit with the corrected Bayer image signal. The bad pixel correction unit is configured to calculate a reference brightness value from the Bayer image signal, to select a variation value from the table of the memory according to the reference brightness value, and to perform the bad pixel correction based on the selected variation value.

In an exemplary embodiment, the bad pixel correction unit is further configured to calculate an adaptive threshold value using a reference threshold value and the selected variation value, to calculate a difference between a brightness value of a target pixel with the reference brightness value, to compare the difference with the adaptive threshold value, and to perform the bad pixel correction by determining the target pixel to have an error (e.g., to be a bad pixel) when the difference is less than the adaptive threshold value and the target pixel to be a normal pixel when the difference is greater than the adaptive threshold value.

In an exemplary embodiment, the bad pixel correction unit is configured to calculate an adaptive threshold value using a reference threshold value and the selected variation value, to calculate brightness distributions according to directions of adjacent pixels to a target pixel (which may be a bad pixel), to compare the adaptive threshold value and the calculated brightness distributions, to select brightness distributions for correcting the target pixel according to the comparison result, and to correct the target pixel using the selected brightness distributions.

In an exemplary embodiment, the image signal processor further comprises a second noise reduction unit (e.g., a fixed pattern noise reduction unit) configured to receive the modified Bayer image signal from the shot noise cancelation unit, to perform fixed pattern noise reduction on the received Bayer image signal to generate a second modified Bayer image signal, and to output the second modified Bayer image signal to the interpolation unit. In an exemplary embodiment, the fixed pattern noise reduction unit is further configured to calculate a reference brightness value of the received Bayer image signal, to select a variation value from the table of the memory according to the reference brightness value, and to perform fixed pattern noise reduction based on the selected variation value.

In an exemplary embodiment, the fixed pattern noise reduction unit is further configured to calculate an adaptive threshold value by adding a reference threshold value and the selected variation value, to calculate a brightness difference according to a pattern to be removed from the received Bayer image signal, to compare the brightness difference with the adaptive threshold value, and to perform strong fixed pattern noise reduction on the received Bayer image signal when the brightness difference is less than the adaptive threshold value and weak fixed pattern noise reduction on the received Bayer image signal when the brightness difference is greater than the adaptive threshold value.

In an exemplary embodiment, the interpolation unit is configured to calculate a reference brightness value from the Bayer image signal, to select a variation value from the table of the memory according to the reference brightness value, and to perform interpolation on the modified Bayer image signal based on the selected variation value.

In an exemplary embodiment, the interpolation unit is further configured to calculate an adaptive threshold value using a reference threshold value and the selected variation value, to select a first interpolation direction, to calculate a brightness difference between a center pixel of the first interpolation direction and adjacent pixels to the center pixel, to compare the calculated difference with the adaptive threshold value, and to accept a directionality of a brightness variation of the first interpolation direction when the calculated difference is less than the adaptive threshold value or ignore a directionality of a brightness variation of the first interpolation direction when the calculated difference is greater than the adaptive threshold value.

In an exemplary embodiment, the interpolation unit is further configured to select a second interpolation direction, to calculate the brightness difference on the second interpolation direction, to compare the calculated difference with the adaptive threshold value, and to accept or ignore a directionality of a brightness variation of the second interpolation direction, and the interpolation unit is further configured to decide a final direction by combing directionalities accepted in the first and second interpolation directions and to perform interpolation according to the decided directionality.

In an exemplary embodiment, the image signal processor further comprises a sharpening unit configured to receive the normal image signal from the interpolation unit, to perform sharpening on the normal image signal. The sharpening unit may output a normal image signal experiencing the sharpening to a post processor. In an exemplary embodiment, the sharpening unit is further configured to calculate a reference brightness value from the normal image signal, to select a variation value from the table of the memory according to the reference brightness value, and to perform the sharpening based on the selected variation value.

In an exemplary embodiment, the sharpening unit is further configured to calculate an adaptive threshold value using a reference threshold value and the selected variation value, to calculate a weighted sum on a brightness difference between a center pixel and adjacent pixels to the center pixel, to compare the calculated weighted sum with the adaptive threshold value, and to apply a weak sharpening filter to the normal image signal when the calculated weighted sum is less than the adaptive threshold value and a strong sharpening filter to the normal image signal when the calculated weighted sum is greater than the adaptive threshold value.

According to an exemplary embodiment of the inventive concept, a mobile device includes an image sensor configured to capture a target image to output a Bayer image signal; an image signal processor configured to receive the Bayer image signal from the image sensor and converts the Bayer image signal into a normal image signal; and a post processor configured to perform image correction on the normal image signal provided from the image signal processor. The image signal processor includes a memory configured to store a table including reference brightness values and variation values according to the reference brightness values; a first noise reduction unit (e.g., a shot noise cancelation unit) configured to calculate a reference brightness value from the Bayer image signal, select a variation value in the table of the memory according to the calculated reference brightness value, and perform a shot noise canceling on the Bayer image signal based on the selected variation value to generate a modified Bayer image signal; and an interpolation unit configured to generate the normal image signal by performing interpolation based on the modified Bayer image signal.

According to an exemplary embodiment of the inventive concept, a system-on chip includes an image signal processor configured to: a) select a partial area of pixels of an image signal, b) calculated a reference brightness from an image signal (e.g., a Bayer image signal) corresponding to the partial area, use the reference brightness to reference an entry of a table to load a threshold, calculate a flatness of the partial area, apply a strong low pass filtering to the image signal when the flatness is less than the threshold, and apply a weak low pass filtering to the image signal when the flatness is not less than the threshold.

In an exemplary embodiment, the reference brightness is an average of brightness differ of pixels of the partial area. In an exemplary embodiment, the flatness is an average of brightness differences between a center pixel of the partial area and pixels of the partial area adjacent to the center pixel.

BRIEF DESCRIPTION OF THE FIGURES

Embodiments of the inventive concept will become apparent from the following description with reference to the following figures, wherein like reference numerals refer to like parts throughout the various figures unless otherwise specified, and wherein.

DETAILED DESCRIPTION

Figure 1:
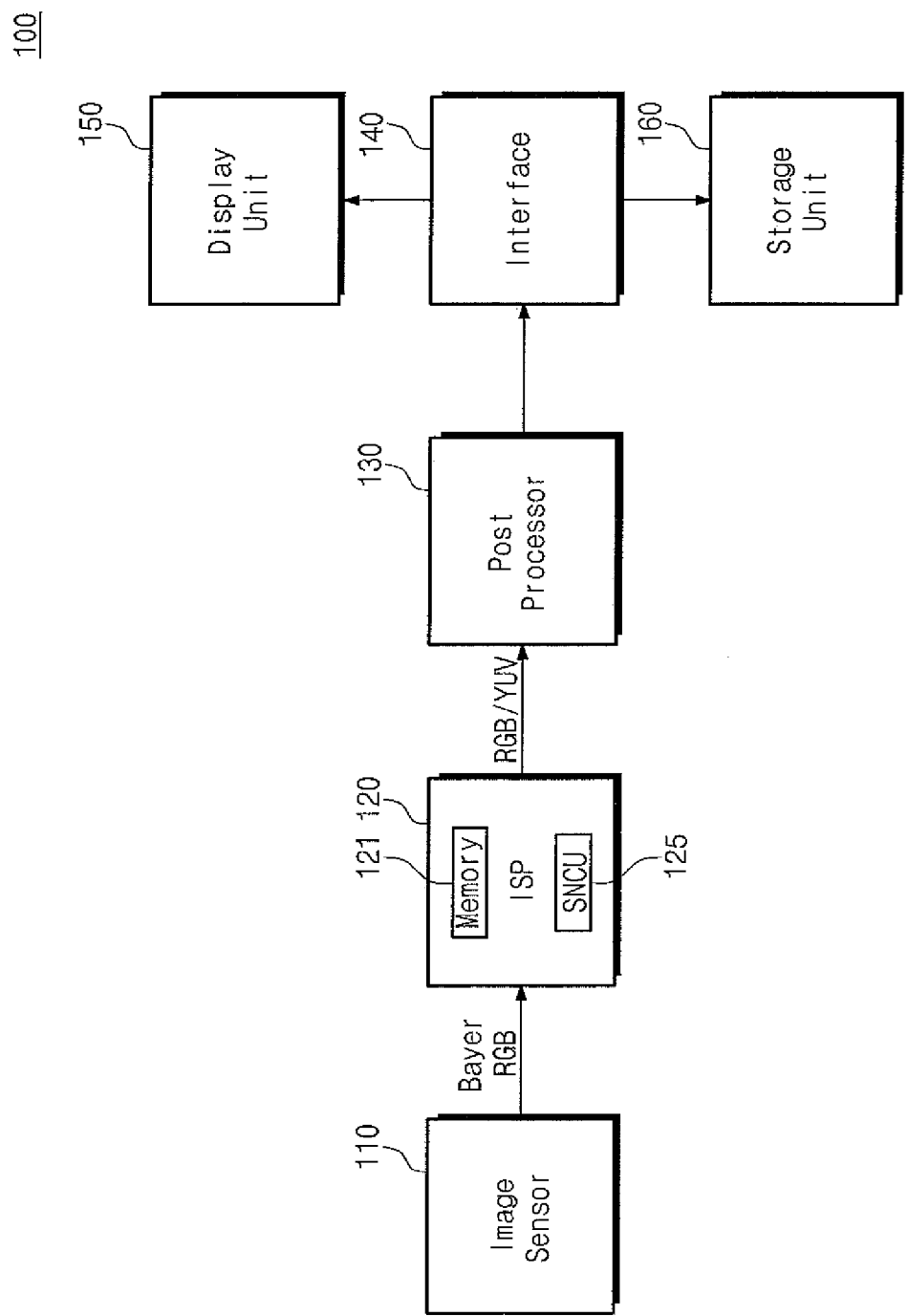
FIG. 1 is a block diagram schematically illustrating an image capture device according to an exemplary embodiment of the inventive concept.

Embodiments of the inventive concept will be described in detail with reference to the accompanying drawings. The inventive concept, however, may be embodied in various different forms, and should not be construed as being limited only to the illustrated embodiments. Unless otherwise noted, like reference numerals denote like elements throughout the attached drawings and written description, and thus descriptions will not be repeated. In the drawings, the sizes and relative sizes of layers and regions may be exaggerated for clarity.

As used herein, the singular forms "a", "an" and "the" are intended to include the plural forms as well, unless the context clearly indicates otherwise. It will be understood that when an element or layer is referred to as being "on", "connected to", "coupled to", or "adjacent to" another element or layer, it can be directly on, connected, coupled, or adjacent to the other element or layer, or intervening elements or layers may be present.

FIG. 1 is a block diagram schematically illustrating an image capture device 100 according to an exemplary embodiment of the inventive concept. Referring to FIG. 1, an image capture device 100 includes an image sensor 110, an image signal processor 120, a post processor 130, an interface 140, a display unit 150, and a storage unit 160.

The image sensor 110 is configured to capture a target image. The image sensor 110 may include a plurality of image sensor pixels arranged in rows and columns. The image sensor 110 may include a CCD (Charge Coupled Device) or CIS (CMOS Image Sensor). The image sensor 110 may capture a target image to output a Bayer image signal. The Bayer image signal may be a Bayer RGB signal.

The image signal processor 120 receives the Bayer image signal from the image sensor 110 and converts the input Bayer image signal into a normal image signal. The normal image signal may be an RGB signal or a YUV signal.

The image signal processor 120 may include a memory 121 and a shot noise cancelation unit 125. The memory 121 may be configured to store a lookup table. The lookup table may include reference brightnesses of the Bayer image signal and variation values according to the reference brightnesses in a table form. The shot noise cancelation unit 125 may perform shot noise cancelation based on the lookup table stored at the memory 121.

The post processor 130 is configured to correct a normal image signal provided from the image signal processor 120. For example, the post processor 130 may include at least one of various function units including a target tracking unit to track a target (e.g., target pixel) of a captured image, a digital image stabilizer (DIS) to correct a motion of the captured image, a correction unit to correct color, noise, etc. of the tracked target, and so on. A corrected image signal processed by the post processor 130 may be output to the interface 140.

The interface 140 receives the corrected image signal from the post processor 130. The interface 140 may be configured to output the corrected image signal to the display unit 150 or the storage unit 160.

The display unit 150 is configured to display the corrected image signal from the interface 140. The display unit 150 may include at least one of display devices such as an LCD (liquid crystal display) device, an OLED (organic light emitting diode) display device, an AMOLED (active-matrix OLED) display device, and so on.

The storage unit 160 is configured to store the corrected image signal from the interface 140 and to output it to the interface 140. The storage unit 160 may include a nonvolatile memory such as a flash memory, a PRAM (Phase Change RAM), an MRAM (Magnetic RAM), a RRAM (Resistive RAM), a FRAM (Ferroelectric RAM), and so on or a volatile memory such as a DRAM (Dynamic RAM), an SRAM (Static RAM), and so on.

Function blocks in the image signal processor 120 and the shot noise cancelation unit 125 may be configured to calculate a reference brightness from the Bayer image signal and to perform shot noise cancelation adaptively according to the calculated reference brightness. Thus, it may be possible to provide an image capture device and an image signal processor having an improved noise cancelation function.

In an exemplary embodiment, the components 120, 130, and 140 are integrated in a system-on-chip. The components 110, 120, 130, and 140 may be integrated in a system-on-chip.

Figure 2:
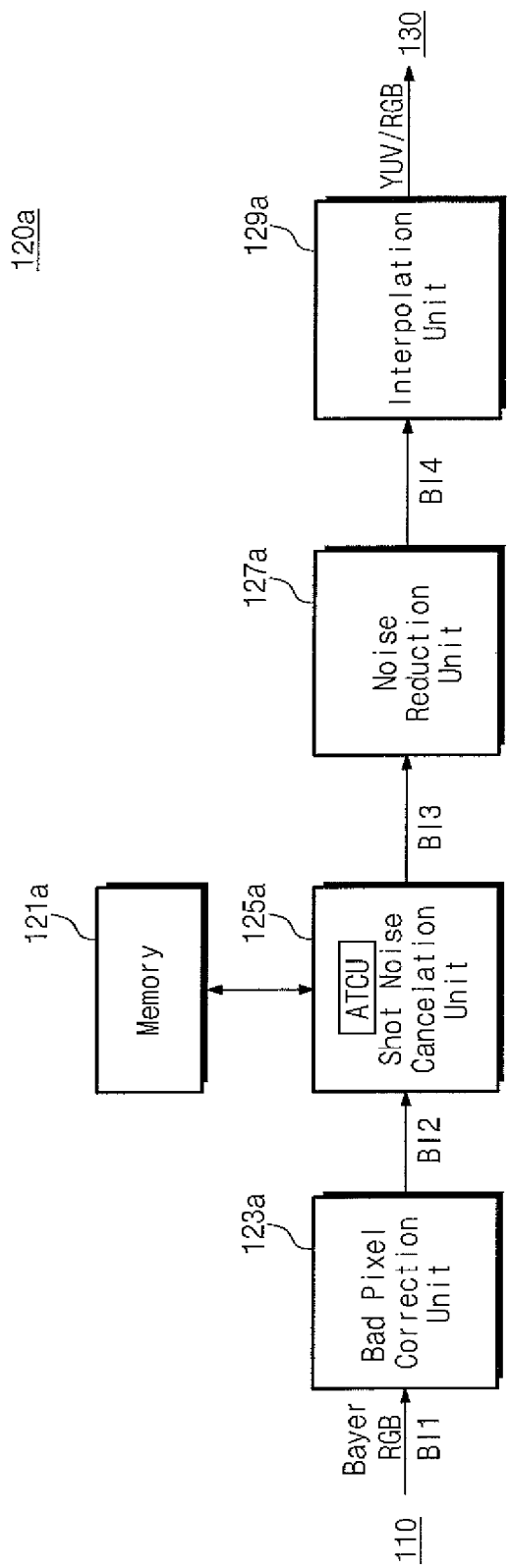
FIG. 2 is a block diagram schematically illustrating an image signal processor according to an exemplary embodiment of the inventive concept.

FIG. 2 is a block diagram schematically illustrating an image signal processor 120a according to an exemplary embodiment of the inventive concept. Referring to FIGS. 1 and 2, an image signal processor 120a includes a memory 121a, a bad pixel correction unit 123a, a shot noise cancelation unit 125a, a fixed pattern noise reduction unit 127a, and an interpolation unit 129a.

The memory 121a may be configured to store reference brightnesses of a Bayer image signal and variation values according to the reference brightnesses using a lookup table.

In an embodiment, the bad pixel correction unit 123a corrects bad pixels based on a Bayer image signal (e.g., a first Bayer image signal BI1) received from an image sensor 110. For example, the bad pixel correction unit 123a determines whether a signal received from a particular pixel of the image sensor 110 is a normal signal or a bad signal, and corrects a signal determined to be a bad signal. The bad pixel correction unit 123a may output a Bayer image signal (e.g., a second Bayer image signal BI2) experiencing bad pixel correction to the shot noise cancelation unit 125a.

In an embodiment, the shot noise cancelation unit 125a is configured to receive the second Bayer image signal BI2 from the bad pixel correction unit 123a. The shot noise cancelation unit 125a may perform shot noise cancelation by calculating flatness of the second Bayer image signal BI2, comparing the calculated flatness with a threshold value, and filtering the second Bayer image signal BI2 according to the comparison result. The flatness may indicate a flat level of brightnesses of pixels of the image sensor 110.

For example, when the flatness of the second Bayer image signal BI2 is high, a brightness difference of lights incident on pixels of the image sensor 110 may be small. In an exemplary embodiment, the shot noise cancelation unit 125a applies a strong low pass filter to the second Bayer image signal BI2 for shot noise cancelation. When the flatness of the second Bayer image signal BI2 is low, a brightness difference of lights incident on pixels of the image sensor 110 may be large. In an exemplary embodiment, the shot noise cancelation unit 125a applies a weak low pass filter to the second Bayer image signal BI2 for shot noise cancelation.

In an embodiment, the shot noise cancelation unit 125a adaptively controls a threshold value used to determine the flatness, based on a reference brightness of the second Bayer image signal BI2. The shot noise cancelation unit 125a may output a Bayer image signal (e.g., third Bayer image signal BI3) experiencing the shot noise cancelation to the fixed pattern noise reduction unit 127a.

In an embodiment, the fixed pattern noise reduction unit 127a receives the third Bayer image signal BI3 from the shot noise cancelation unit 125a. In an embodiment, the fixed pattern noise reduction unit 127a is configured to reduce a fixed pattern noise of the third Bayer image signal BI3. The fixed pattern noise reduction unit 127a may output a Bayer image signal (e.g., fourth Bayer image signal BI4) experiencing fixed pattern noise reduction to the interpolation unit 129a.

In an embodiment, the interpolation unit 129a receives the fourth Bayer image signal BI4 from the fixed pattern noise reduction unit 127a. In an embodiment, the interpolation unit 129a is configured to perform interpolation based on the fourth Bayer image signal BI4. The interpolation unit 129a may be configured to generate a normal image signal based on the interpolation result. The normal image signal is output to a post processor 130.

In FIG. 2, there is illustrated an example where the components 123a, 125a, 127a, and 129a are sequentially chained. However, the inventive concept is not limited thereto. For example, the shot noise cancelation unit 125a may be placed before the bad pixel correction unit 123a.

Figure 3:
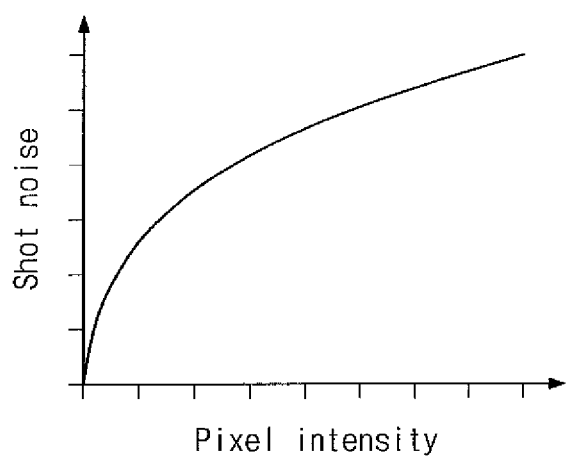
FIG. 3 is a graph schematically illustrating a relation between pixel intensity and a shot noise.

FIG. 3 is a graph schematically illustrating a relation between pixel intensity and a shot noise. In FIG. 3, a horizontal axis indicates pixel intensity, and a vertical axis indicates an RMS (Root-Mean-Square) value of a shot noise. For ease of description, the inventive concept will be described under the assumption that brightness (i.e., pixel intensity) of light incident on a pixel is brightness of a pixel.

Referring to FIGS. 1 to 3, the RMS value of the shot noise is proportional to a square root of the pixel intensity. That is, the shot noise is understood to be proportional to a square root of the brightness of a pixel. The shot noise may increase according to an increase in the brightness of a pixel.

The shot noise may cause various abnormal operations of an image signal processor 120 and a post processor 130. For example, a fixed pattern noise reduction unit 127a may reduce a fixed pattern noise by applying various filters according to brightness of a pixel indicated by a third Bayer image signal BI3 or a brightness difference between the pixel indicated by the third Bayer image signal BI3 and peripheral pixels. Since the shot noise affects the brightness of pixel, it may cause an abnormal operation when a fixed pattern noise reducing operation is performed.

In an embodiment, an interpolation unit 129a performs interpolation according to the brightness of a pixel indicated by a fourth Bayer image signal BI4. For example, the interpolation unit 129a may calculate brightness differences of pixels of an image sensor 110 according to various directions and decide directionality of pixels by analyzing the brightness differences according to each direction. The interpolation unit 129a may perform interpolation according to the decided directionality. Since the shot noise affects the brightness of pixel, it may cause an abnormal operation when an interpolation operation is performed.

If an abnormal operation occurs during the noise reducing operation or the interpolation operation, an operation of a post processor 130 may be influenced by such an abnormal operation. Also, the shot noise may be reflected to the post processor 130. That is, if the shot noise is left, such an abnormal operation may be accumulated and amplified through an image signal processor 120 and the post processor 130, so that the quality of images captured by an image capture device 100 is reduced.

The image signal processor 120 or the image capture device 100 according to an exemplary embodiment of the inventive concept includes a shot noise cancelation unit 125a to cancel the shot noise. The shot noise cancelation unit 125a may be configured to cancel the shot noise adaptively based on a characteristic of the shot noise illustrated in FIG. 3. Also, function blocks in the image signal processor 120 may attenuate influence of the shot noise using different adaptive threshold values in operation.

In an exemplary embodiment, the shot noise cancelation unit 125a includes an adaptive threshold value calculating unit ATCU. The adaptive threshold value calculating unit ATCU calculates a reference brightness of an input image signal, selects a variation value in a memory 121a based on the reference brightness and calculates the adaptive threshold value using the selected variation value.

Figure 4:
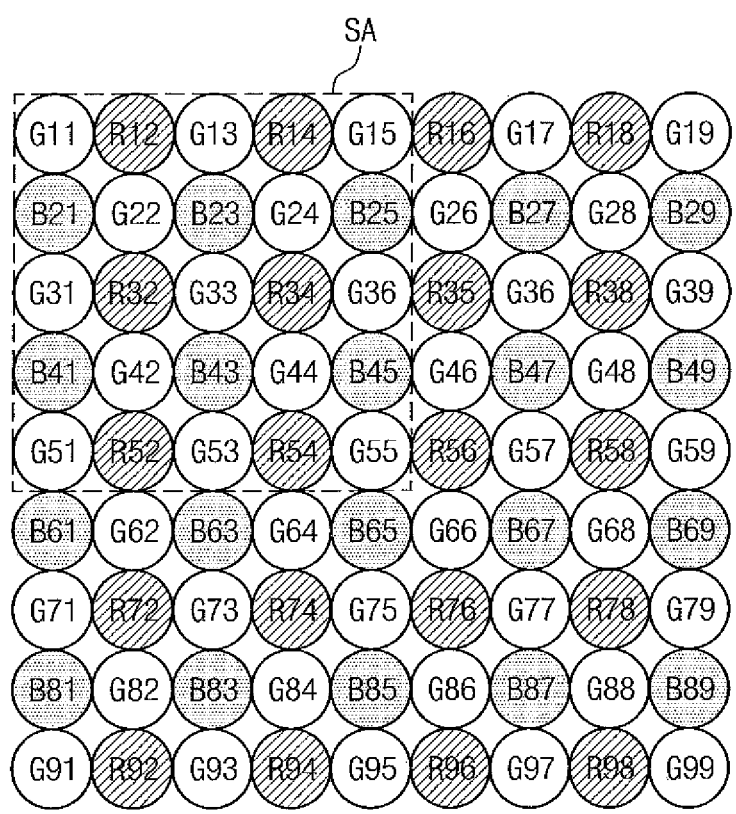
FIG. 4 is a diagram schematically illustrating a portion of a pixel array of an image sensor.

FIG. 4 is a diagram schematically illustrating a portion of a pixel array of an image sensor 110. Referring to FIGS. 1 to 4, an image sensor 110 may include a plurality of pixels arranged in a matrix form. Pixels marked by a reference symbol G are pixels corresponding to a green light. Pixels marked by a reference symbol R are pixels corresponding to a red light. Pixels marked by a reference symbol B are pixels corresponding to a blue light. Numbers marked at left sides of the reference numbers R, G and B indicate rows and columns of the pixels.

A shot noise cancelation unit 125a selects a partial area SA of the pixel array of the image sensor 110. Exemplarily, the shot noise cancelation unit 125a may select an area including a pixel being a target for shot noise cancelation and adjacent pixels to the pixel as the partial area SA. The shot noise cancelation unit 125a may select the partial area SA by the particular unit.

For example, the shot noise cancelation unit 125a may select the partial area SA of the image sensor 110 by selecting a portion of a second Bayer image signal BI2. For ease of description, below, expressions associated with pixels of the image sensor 110, such as expressions that indicate which pixels of the image sensor 110 are selected, expressions that indicate the brightness of the selected pixels, and expressions that indicate how the brightness of pixels are calculated may be understood to be performed based on a Bayer image signal or a normal image signal.

Exemplarily, the shot noise cancelation unit 125a may select pixels, having a particular color, from among the selected partial area SA. The shot noise cancelation unit 125a may select green pixels to perform shot noise cancelation, select red pixels to perform shot noise cancelation, and select blue pixels to perform shot noise cancelation. Below, for ease of description, there will be described an example where green pixels are selected.

The shot noise cancelation unit 125a may calculate flatness of pixels of the selected partial area SA. The flatness may be calculated according to the following equation 1.

$$S = \frac{|G33 - G13| + |G33 - G31| + |G33 - G35| + |G33 - G53|}{4} \quad (1)$$

In equation 1, "S" indicates flatness. The flatness S is calculated by calculating the average of brightness differences between a center pixel or a target pixel G33 of the selected partial area SA and adjacent pixels G13, G31, G35, and G53. The adjacent pixels need not be immediately adjacent to the center pixel as an intervening pixel (e.g., G22) may be present between the center pixel and the adjacent pixel. The greater a brightness difference between pixels of the selected partial area SA, the greater the flatness. The smaller a brightness difference between pixels of the selected partial area SA, the smaller the flatness.

The equation 1 is exemplary and the inventive concept is not limited thereto. For example, the flatness S may be calculated using a weighted average of brightness differences between the target pixel G33 and adjacent pixels to the target pixel G33. The flatness S may be calculated using an average or a weighted average of brightness differences between adjacent pixels to the target pixel G33. The flatness S may be calculated using a distribution or a standard deviation between pixels of the selected partial area SA having the same color. A method of calculating the flatness S may be changed according to various algorithms of an image capture device 100 or an image signal processor 120.

The shot noise cancelation unit 125a calculates a reference brightness of pixels of the selected partial area SA. For example, the shot noise cancelation unit 125a may calculate an average of brightnesses of pixels of the selected partial area SA as the reference brightness. The shot noise cancelation unit 125a may calculate a weighted average of brightnesses of pixels of the selected partial area SA as the reference brightness.

For example, the shot noise cancelation unit 125a may set a high weight (or, a low weight) to a target pixel for shot noise cancelation of pixels of the selected partial area SA and a weight that increases according to adjacent pixels and the target pixel to the adjacent pixels. The shot noise cancelation unit 125a may set a high weight (or, a low weight) to a brightness placed at the center of the selected partial area SA and a low weight (or, a high weight) to a brightness of a pixel placed at the edge of the selected partial area SA. The shot noise cancelation unit 125a may calculate a reference brightness by setting a weight proportional (or, inversely proportional) to a brightness of each of pixels of the selected partial area SA. A weight setting method of the shot noise cancelation unit 125a may be changed according to various algorithms driven at the image signal processor 120 or a post processor 130. Thus, the weight setting method of the shot noise cancelation unit 125a is not limited to any particular method mentioned within this disclosure.

The shot noise cancelation unit 125a selects a variation value of a threshold value for comparison with the flatness S of the selected partial area SA, based on the calculated reference brightness. As illustrated in FIG. 3, if the brightnesses of pixels increase, a shot noise level also increases. The excessive shot noise level may cause an error when the shot noise cancelation 125 compares the variation value with the flatness S.

Exemplarily, it is assumed that the flatness S of pixels of the selected partial area SA has a particular value. If the brightnesses of pixels of the selected partial area SA increase, a shot noise level may also increase. The shot noise may be generated randomly at pixels of the selected partial area SA. The brightness of a pixel at which the shot noise is generated may be shown to be more dark or light than a normal brightness.

If the average brightness of pixels of the selected partial area SA having the flatness S of a particular value increases, a level of the shot noise randomly generated at pixels of the selected partial area SA may increase. The increase in the shot noise level may cause an increase in the flatness S of pixels of the selected partial area SA. That is, when the shot noise cancelation unit 125a compares the flatness S of the selected partial area SA having a particular value, a comparison result of the flatness S may vary according to the average brightness of pixels of the selected partial area SA.

To prevent the above described error, the shot noise cancelation unit 125a according to an exemplary embodiment of the inventive concept is configured to adaptively control a threshold value for comparison with the flatness S according to a characteristic of the shot noise described with reference to FIG. 3.

Exemplarily, the shot noise cancelation unit 125a selects an adaptive threshold value according to the following equation 2.

$$T2 = T1 + a\sqrt{I} \qquad (2)$$

In equation 2, "T1" indicates a reference threshold value, and "a" indicates a factor considering a scaling factor varied according to a reference noise of an image sensor 110, a lighting condition, and an algorithm of the shot noise cancelation unit 125a. "I" indicates a reference brightness of pixels of the selected partial area SA, and "T2" indicates an adaptive threshold value.

The shot noise cancelation unit 125a selects the adaptive threshold value T2 by reflecting a square root of a reference brightness to the reference threshold value T1 according to a characteristic of the shot noise illustrated in FIG. 3. If the flatness S of pixels of the selected partial area SA is compared using the adaptive threshold value T2, it may be compared under a condition where influence of the shot noise is attenuated.

The equation 1 for calculating the adaptive threshold value T2 may include a square root calculation. High complexity and long calculation time of a circuit for performing the square root calculation may increase overhead of an image capture device 100. Thus, the image capture device 100 and an image signal processor 120 according to an exemplary embodiment of the inventive concept may be configured to store square root calculation values according to the reference brightness I at a memory 121a in a lookup table form.

Exemplarily, a lookup table stored at the memory 121a may be configured to store various ranges of reference brightnesses and variation values (e.g., $\sqrt{I}$ or $a\sqrt{I}$) according to the ranges of reference brightnesses. The shot noise cancelation unit 125a may deduct the adaptive threshold value T2 by calculating the reference brightness I of the selected partial area SA, selecting a variation value referring to the lookup table stored at the memory 121a according to the reference brightness I, and calculating the selected variation value and the reference threshold value T1. Thus, the shot noise may be reduced without an increase in overhead of the image capture device 100 or the image signal processor 120.

Figure 5:
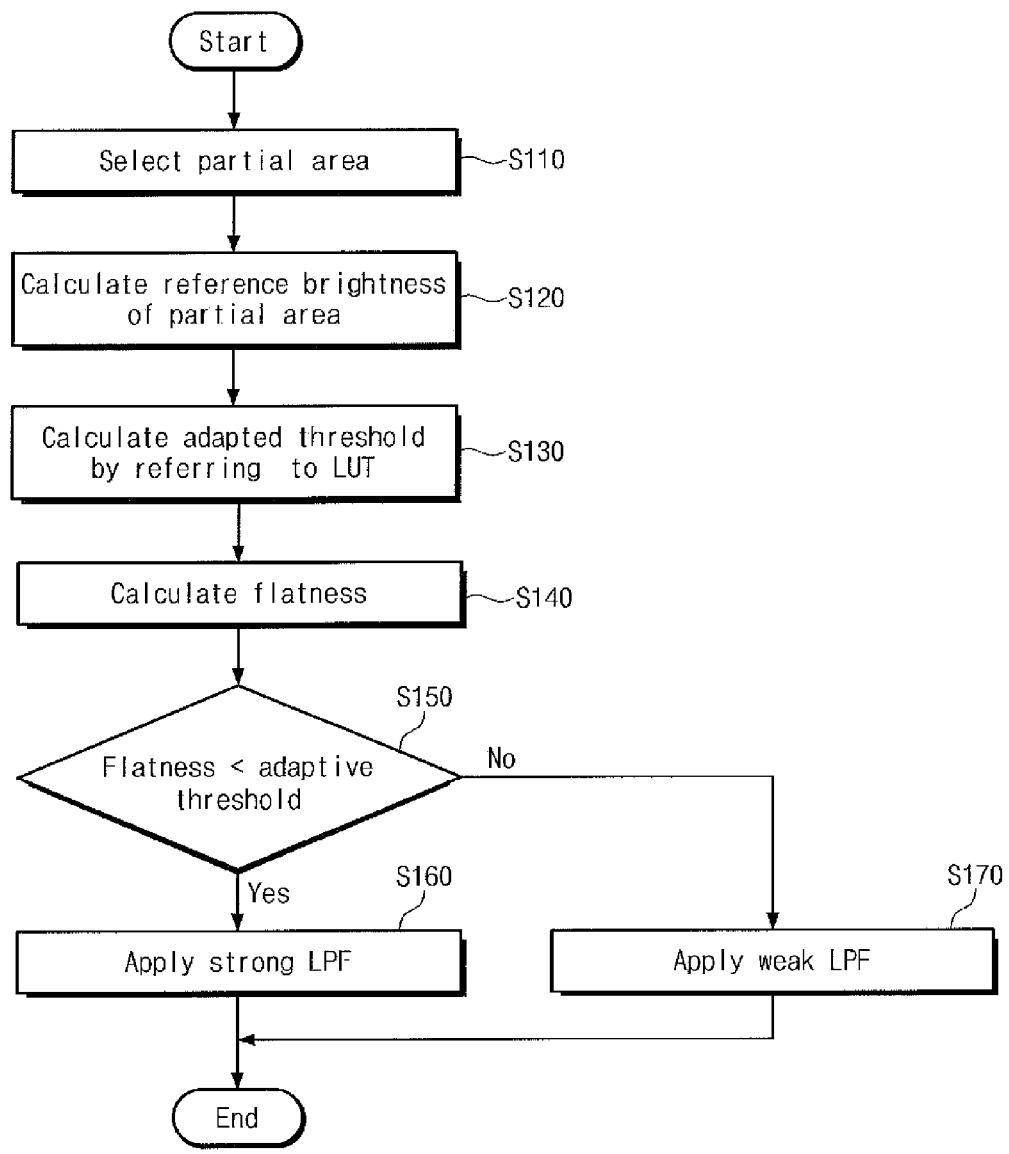
FIG. 5 is a flow chart schematically illustrating a shot noise cancelation method according to an exemplary embodiment of the inventive concept.

FIG. 5 is a flow chart schematically illustrating a shot noise cancelation method according to an exemplary embodiment of the inventive concept. Referring to FIGS. 1, 2, 4, and 5, a shot noise cancelation unit 125a selects a partial area SA of pixels of an image sensor 110 (S110). For example, the shot noise cancelation unit 125a selects an area including a center or target pixel for shot noise cancelation and adjacent pixels to the target pixel as the partial area SA.

The shot noise cancelation unit 125a may select the partial area SA by the particular unit.

The shot noise cancelation unit 125a calculates a reference brightness I of the selected partial area SA (S120). For example, the shot noise cancelation unit 125a may calculate a weighted average of brightnesses of pixels of the selected partial area SA as the reference brightness I.

The shot noise cancelation unit 125a calculates an adaptive threshold value T2 by referring to a lookup table stored at a memory 121a (S130). For example, the shot noise cancelation unit 125a selects a variation value from the lookup table using the calculated reference brightness I. The shot noise cancelation unit 125a calculates the adaptive threshold value T2 using the selected variation value and a reference threshold value T1.

The shot noise cancelation unit 125a calculates a flatness S of the selected partial area SA (S140). For example, the shot noise cancelation unit 125a may calculate the flatness S of the selected partial area SA according to the above-described equation 1.

The shot noise cancelation unit 125a compares the flatness S with an adaptive threshold value T2 (S150).

If the flatness S is less than the adaptive threshold value T2, the brightness of pixels of the selected partial area SA is determined to be flat. The shot noise cancelation unit 125a applies a strong low pass filter to the selected partial area SA (S160). That is, if the selected partial area SA is determined to be flat, the shot noise cancelation unit 125a strongly attenuates a shot noise using the strong low pass filter. A variation in the shot noise according to the brightness of pixels of the selected partial area SA may be compensated through the adaptive threshold value T2.

If the flatness S is greater than the adaptive threshold value T2, the brightness of pixels of the selected partial area SA are determined not to be flat. The shot noise cancelation unit 125a applies a weak low pass filter to the selected partial area SA if the flatness S is less than the adaptive threshold value T2 (S170). That is, if the selected partial area SA is determined not to be flat (e.g., if the selected partial area SA includes a complex image), the shot noise cancelation unit 125a weakly attenuates a shot noise using the weak low pass filter such that damage on an original image is minimized.

Exemplarily, the shot noise cancelation unit 125a replaces an original signal corresponding to a target pixel with a signal corresponding to the target pixel of a filtered signal. The shot noise cancelation unit 125a may replace an original signal corresponding to the selected partial area SA with a filtered signal.

Exemplarily, the shot noise cancelation unit 125a may perform shot noise cancelation with the selected partial area SA being shifted. The shot noise cancelation unit 125a may select a next target pixel and adjacent pixels thereto to perform shot noise cancelation. The shot noise cancelation unit 125a may select a next partial area according to a predetermined unit to perform shot noise cancelation.

Figure 6:
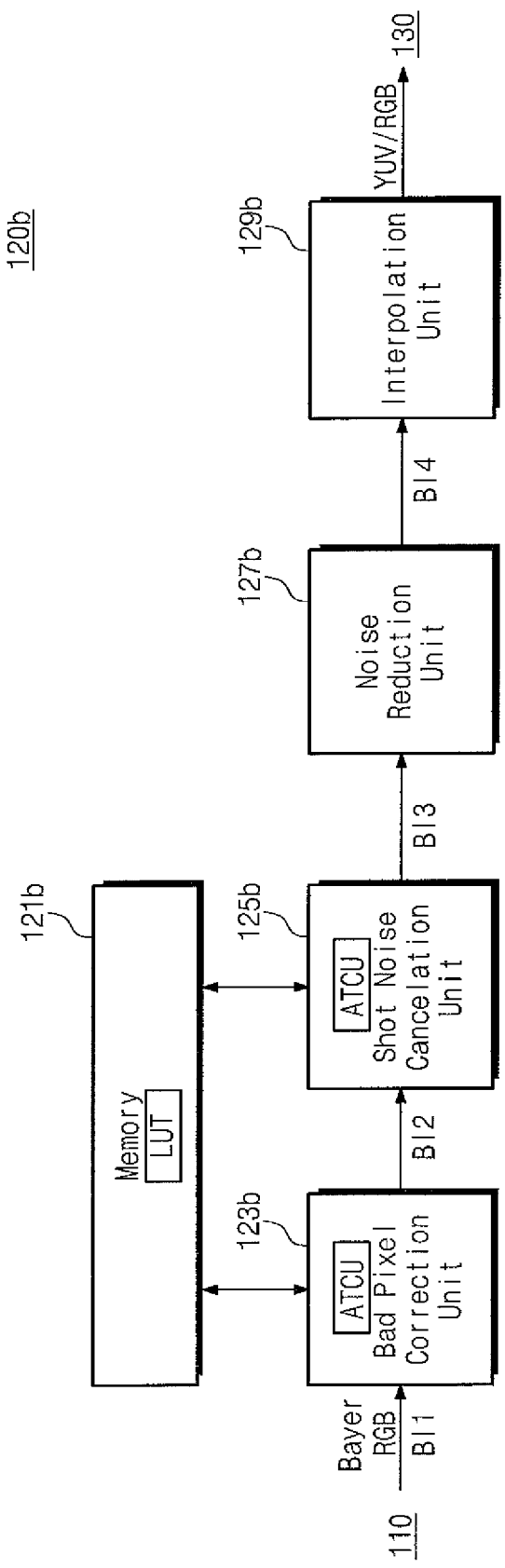
FIG. 6 is a block diagram schematically illustrating an image signal processor according to an exemplary embodiment of the inventive concept.

FIG. 6 is a block diagram schematically illustrating an image signal processor 120b according to an exemplary embodiment of the inventive concept. Referring to FIG. 6, an image signal processor 120b includes a memory 121b, a bad pixel correction unit 123b, a shot noise cancelation unit 125b, a fixed pattern noise reduction unit 127b, and an interpolation unit 129b. The bad pixel correction unit 123b includes an adaptive threshold value calculating unit ATCU. The adaptive threshold value calculating unit ATCU calculates a reference brightness of an image signal, selects a variation value of the memory 121b based on the reference brightness, and calculates an adaptive threshold value using the selected variation value. The bad pixel correction unit 123b performs bad pixel correction based on the adaptive threshold value. The shot noise cancelation unit 125b may perform shot noise cancelation as described with reference to FIGS. 2 to 5.

Figure 7A:
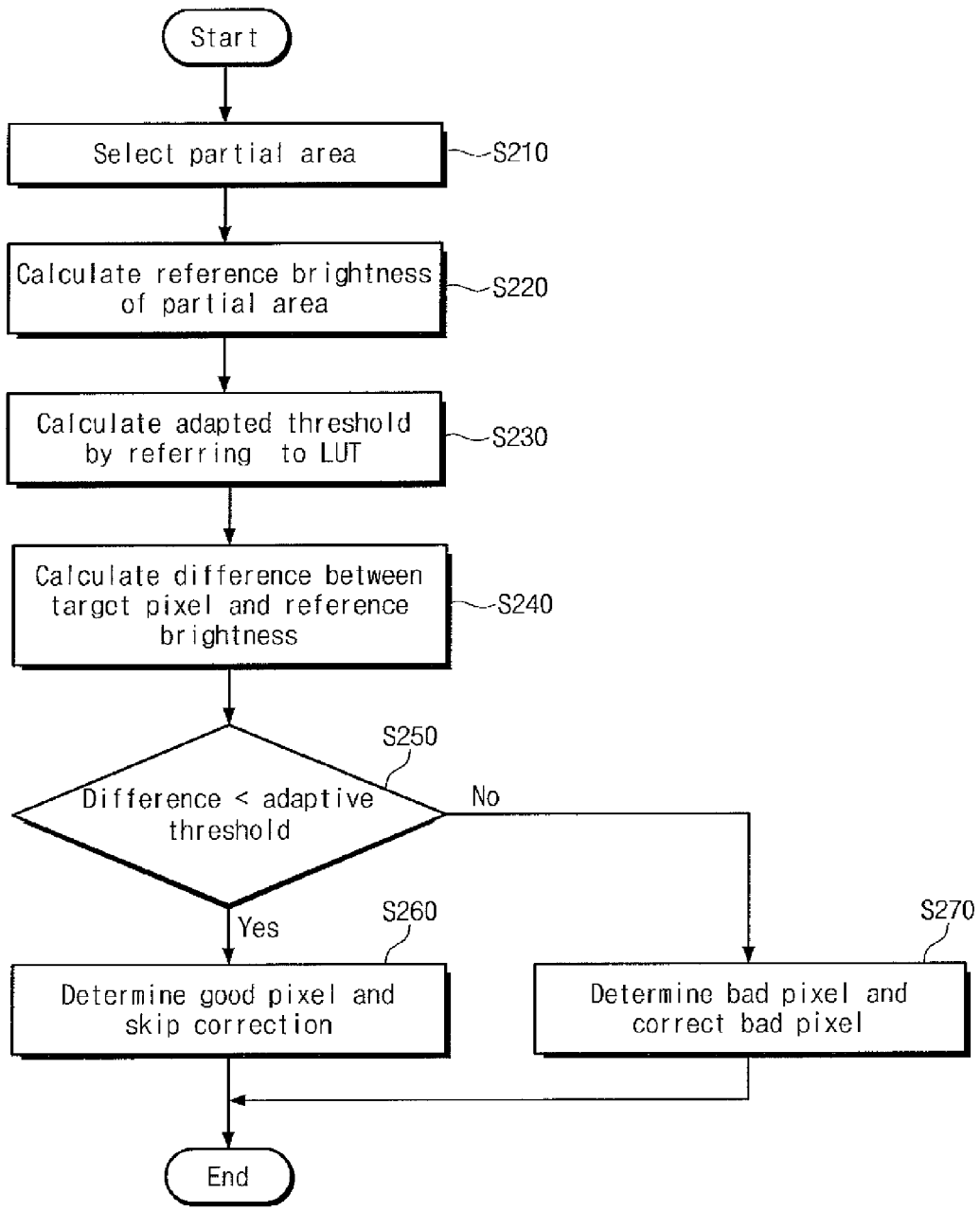
FIG. 7A is a flow chart schematically illustrating a bad pixel correction method according to an exemplary embodiment of the inventive concept.

FIG. 7A is a flow chart schematically illustrating a bad pixel correction method according to an exemplary embodiment of the inventive concept. Referring to FIGS. 4, 6, and 7A, a bad pixel correction unit 123b selects a partial area SA of pixels of an image sensor 110 (S210). A size of the partial area SA selected by the bad pixel correction unit 123b may be different from that of a partial area selected by the shot noise cancelation unit 125b.

The bad pixel correction unit 123b calculates a reference brightness I of a first Bayer image signal BI1 (S220).

The bad pixel correction unit 123b calculates an adaptive threshold value T2 by referring to a lookup table stored at the memory 121b (S230). Exemplarily, the bad pixel correction unit 123b selects a variation value by referring to the lookup table and calculates a scaling factor based on the selected variation value. The bad pixel correction unit 123b may calculate the adaptive threshold value T2 using the scaled variation value and a predetermined reference threshold value T1. The reference threshold value T1 of the bad pixel correction unit 123b may be different from a reference threshold value of the shot noise cancelation unit 125b.

The bad pixel correction unit 123b calculates a difference between a brightness of a target pixel and a reference brightness I (S240). The bad pixel correction unit 123b determines whether the calculated difference is less than the adaptive threshold value T2 (S250). If the calculated difference is less than the adaptive threshold value T2, the bad pixel correction unit 123b determines the target pixel to be a normal pixel (S260). In this case, bad pixel correction may be skipped.

If the calculated difference is greater than the adaptive threshold value T2, the bad pixel correction unit 123b determines the target pixel to be a bad pixel (S270). In this case, bad pixel correction is performed.

If the bad pixel correction unit 123b uses the adaptive threshold value T2, such an error that a normal pixel is decided to be a bad pixel due to a shot noise or such an error that a bad pixel is decided to be a normal pixel due to a shot noise may be reduced.

Figure 7B:
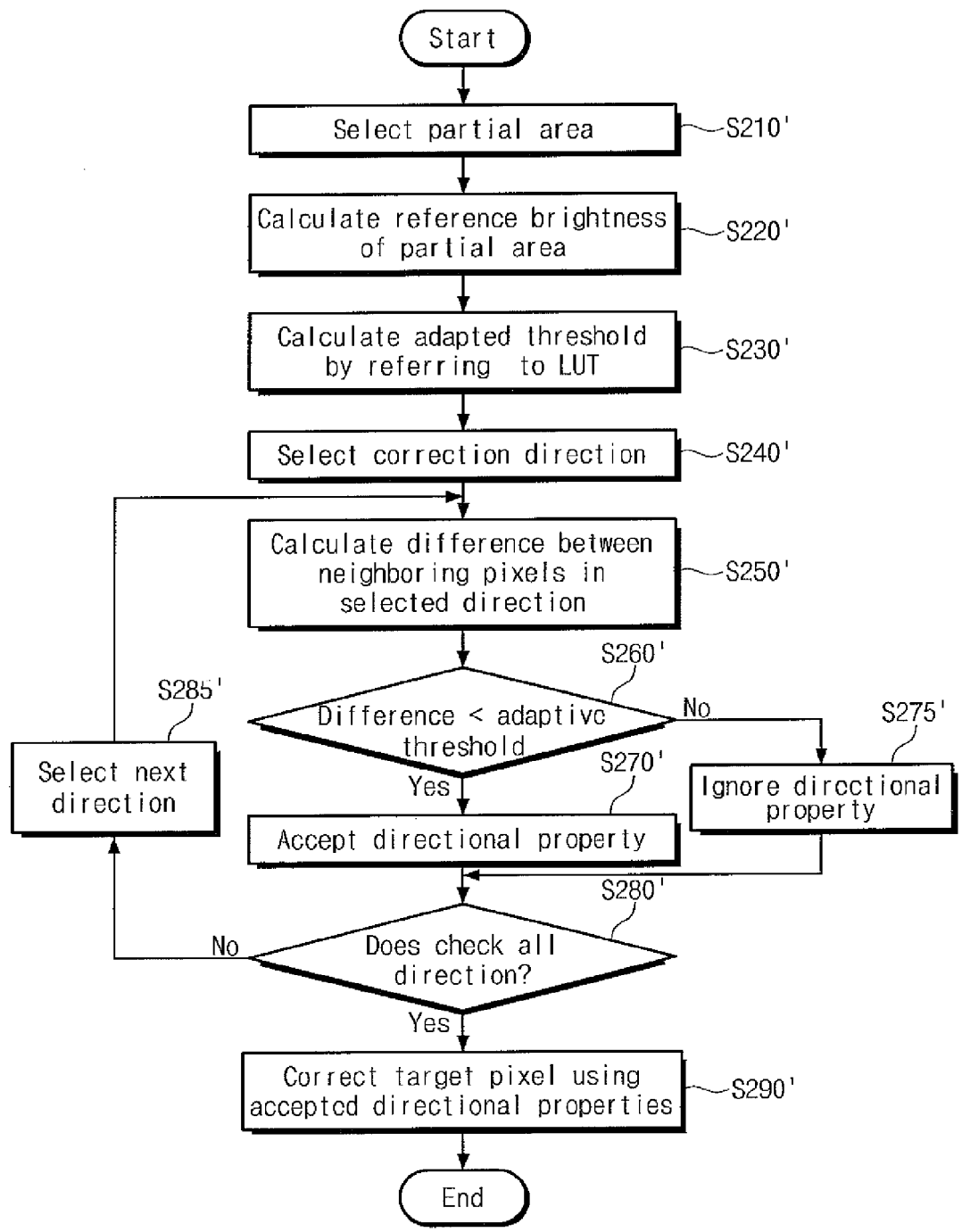
FIG. 7B is a flow chart schematically illustrating a bad pixel correction method according to an exemplary embodiment of the inventive concept.

FIG. 7B is a flow chart schematically illustrating a bad pixel correction method according to an exemplary embodiment of the inventive concept. Referring to FIGS. 4, 6, and 7B, a bad pixel correction unit 123b selects a partial area SA of pixels of an image sensor 110 (S210'). A size of the partial area SA selected by the bad pixel correction unit 123b may be different from that of a partial area selected by the shot noise cancelation unit 125b.

The bad pixel correction unit 123b calculates a reference brightness I from a first Bayer image signal BI1 (S220').

The bad pixel correction unit 123b calculates an adaptive threshold value T2 by referring to a lookup table stored at the memory 121b (S230'). Exemplarily, the bad pixel correction unit 123b may select a variation value by referring to the lookup table and calculate a scaling factor based on the selected variation value. The bad pixel correction unit 123b may calculate the adaptive threshold value T2 using the scaled variation value and a predetermined reference threshold value T1. The reference threshold value T1 of the bad pixel correction unit 123b may be different from a reference threshold value of the shot noise cancelation unit 125b.

The bad pixel correction unit 123b selects a correction direction (S240'). For example, the bad pixel correction unit 123b selects one of vertical, horizontal and diagonal directions on the basis of a target pixel.

The bad pixel correction unit 123b calculates a difference between brightnesses of adjacent pixels in the selected direction (S250').

The bad pixel correction unit 123b determines whether the calculated difference is less than the adaptive threshold value T2 (S260'). If the calculated difference is less than the adaptive threshold value T2, the bad pixel correction unit 123b accepts a characteristic of the selected correction direction (S270').

If the calculated difference is not less than the adaptive threshold value T2, the bad pixel correction unit 123b ignores a characteristic of the selected correction direction (e.g., brightness directionality of pixels) (S275').

The bad pixel correction unit 123b determines whether all correction directions are checked (S280'). If all the directions have not been checked, the bad pixel correction unit 123b selects a next direction (S285'), and the method proceeds to operation S250'. If all the directions were checked, the bad pixel correction unit 123b corrects the target pixel using characteristics of the accepted correction direction (e.g., brightness directionalities of pixels) (S290').

If the bad pixel correction unit 123b uses the adaptive threshold value T2, such an error that a normal pixel is decided to be a bad pixel due to a shot noise or such an error that a bad pixel is decided to be a normal pixel due to a shot noise may be reduced.

Figure 8:
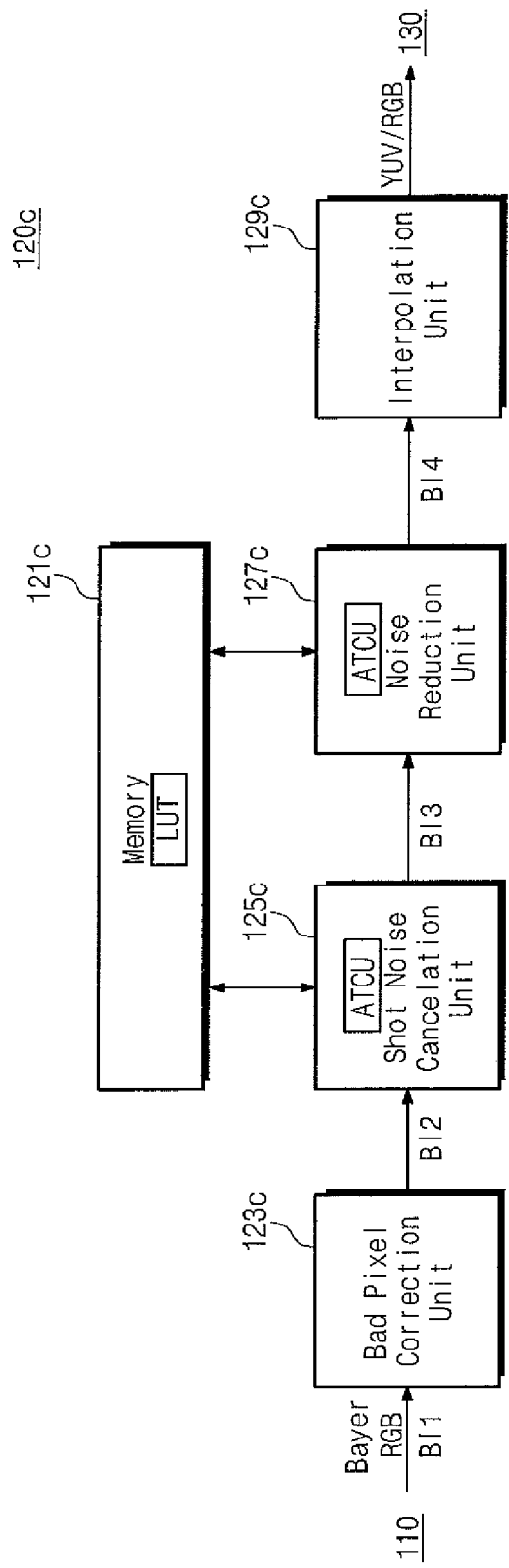
FIG. 8 is a block diagram schematically illustrating an image signal processor according to still an exemplary embodiment of the inventive concept.

FIG. 8 is a block diagram schematically illustrating an image signal processor 120c according to an exemplary embodiment of the inventive concept. Referring to FIG. 8, an image signal processor 120c includes a memory 121c, a bad pixel correction unit 123c, a shot noise cancelation unit 125c, a fixed pattern noise reduction unit 127c, and an interpolation unit 129c. Referring to FIG. 8, the fixed pattern noise reduction unit 127c includes an adaptive threshold value calculating unit ATCU. The adaptive threshold value calculating unit ATCU calculates a reference brightness of an image signal, selects a variation value of the memory 121c based on the reference brightness, and calculates an adaptive threshold value using the selected variation value. The fixed pattern noise reduction unit 127c performs fixed pattern noise reduction based on the adaptive threshold value. The shot noise cancelation unit 125c may perform shot noise cancelation as described with reference to FIGS. 2 to 5.

Figure 9:
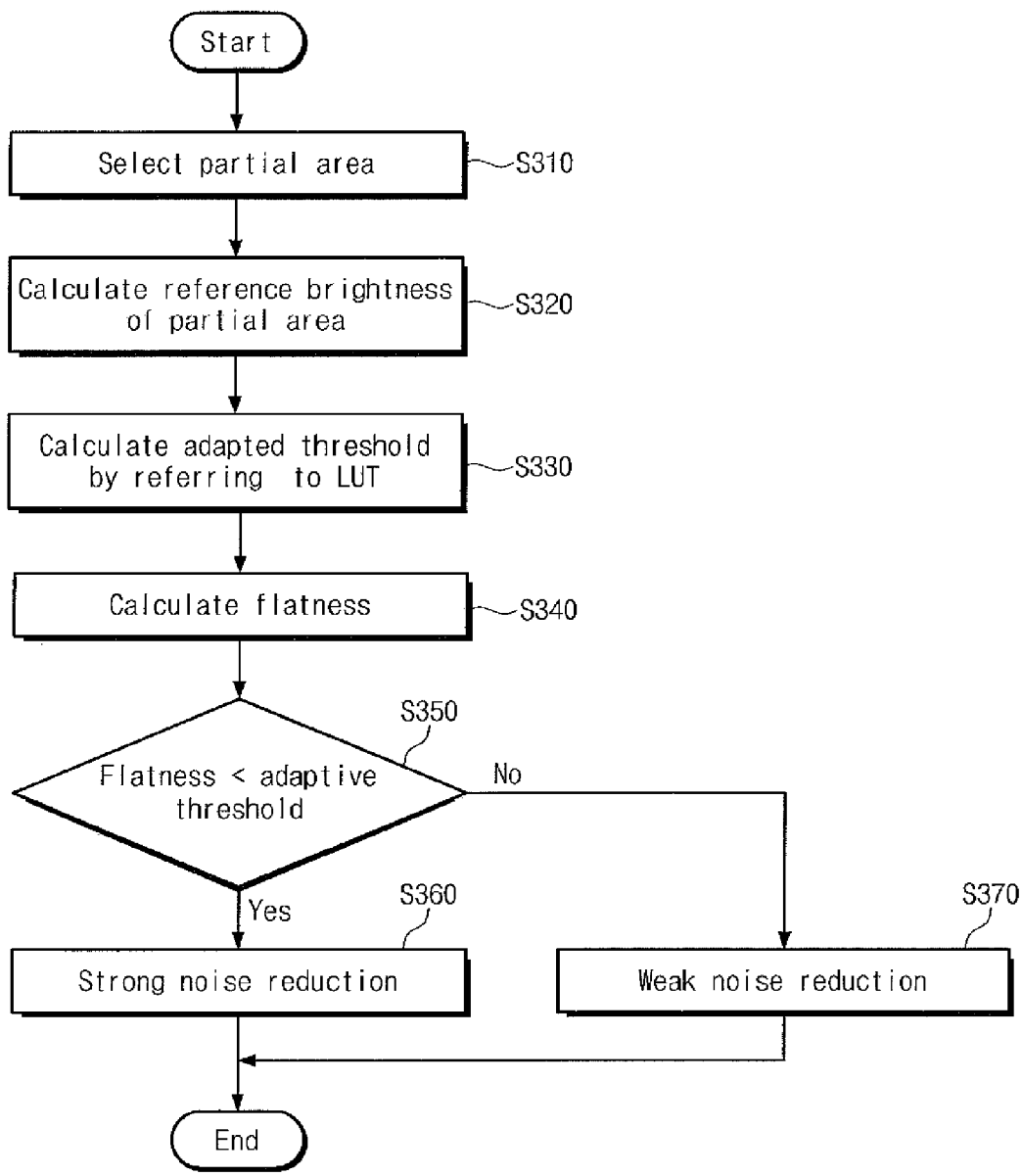
FIG. 9 is a flow chart schematically illustrating a noise reduction method according to an exemplary embodiment of the inventive concept.

FIG. 9 is a flow chart schematically illustrating a noise reduction method according to an exemplary embodiment of the inventive concept. Referring to FIGS. 4, 8, and 9, a fixed pattern noise reduction unit 127c selects a partial area SA of pixels of an image sensor 110 (S310). A size of the partial area SA selected by the fixed pattern noise reduction unit 127c may be different from that of a partial area selected by the shot noise cancelation unit 125c.

The fixed pattern noise reduction unit 127c calculates a reference brightness I of a third Bayer image signal BI3 (S320).

The fixed pattern noise reduction unit 127c calculates an adaptive threshold value T2 by referring to a lookup table stored at the memory 121c (S330). Exemplarily, the fixed pattern noise reduction unit 127c selects a variation value by referring to the lookup table and calculates a scaling factor based on the selected variation value. The fixed pattern noise reduction unit 127c may calculate the adaptive threshold value T2 using the scaled variation value and a predetermined reference threshold value T1. The reference threshold value T1 of the fixed pattern noise reduction unit 127c may be different from a reference threshold value of the shot noise cancelation unit 125c.

The fixed pattern noise reduction unit 127c calculates a flatness S of the selected partial area SA (S340). For example, fixed pattern noise reduction unit 127c may calculate the flatness S of the selected partial area SA according to the above-described equation 1 and may calculate the flatness S using brightness differences between pixels located at a pattern to be removed. For example, when a target pixel is a green pixel and a pattern mismatch pattern (e.g., Gr-Gb) between green pixels placed at a diagonal line is removed, the fixed pattern noise reduction unit 127c may calculate the flatness S by calculating the average of brightness differences between the target pixel and four diagonal pixels. In the event that a periodic mismatch pattern appearing every n-th column of pixels is removed, the fixed pattern noise reduction unit 127c may calculate the flatness S by calculating the average of brightness differences between the target pixel and n pixels located at left and right sides of the target pixel.

The fixed pattern noise reduction unit 127c compares the calculated flatness S with the adaptive threshold value T2 to determine whether the flatness S is less than the adaptive threshold T2 (S350).

If the calculated flatness S is less than the adaptive threshold value T2, pixels of the selected partial area SA may be determined to be located at a flat area. The fixed pattern noise reduction unit 127c applies strong fixed pattern noise reduction to the selected partial area SA if the calculated flatness S is less than the adaptive threshold value T2 (S360).

If the calculated flatness S is greater than the adaptive threshold value T2, pixels of the selected partial area SA may be determined to be located at an area where many textures exist. The fixed pattern noise reduction unit 127c applies weak fixed pattern noise reduction to the selected partial area SA if the calculated flatness S is not less than the adaptive threshold value T2 (S370), which may minimize damage of the textures.

The fixed pattern noise reduction method described with reference to FIG. 9 may be performed in addition to another fixed pattern noise reduction method. For example, fixed pattern noise reduction may be performed considering the adaptive threshold value T2 additionally, and an operation of performing fixed pattern noise reduction in consideration of the adaptive threshold value T2 may be additionally provided.

Figure 10:
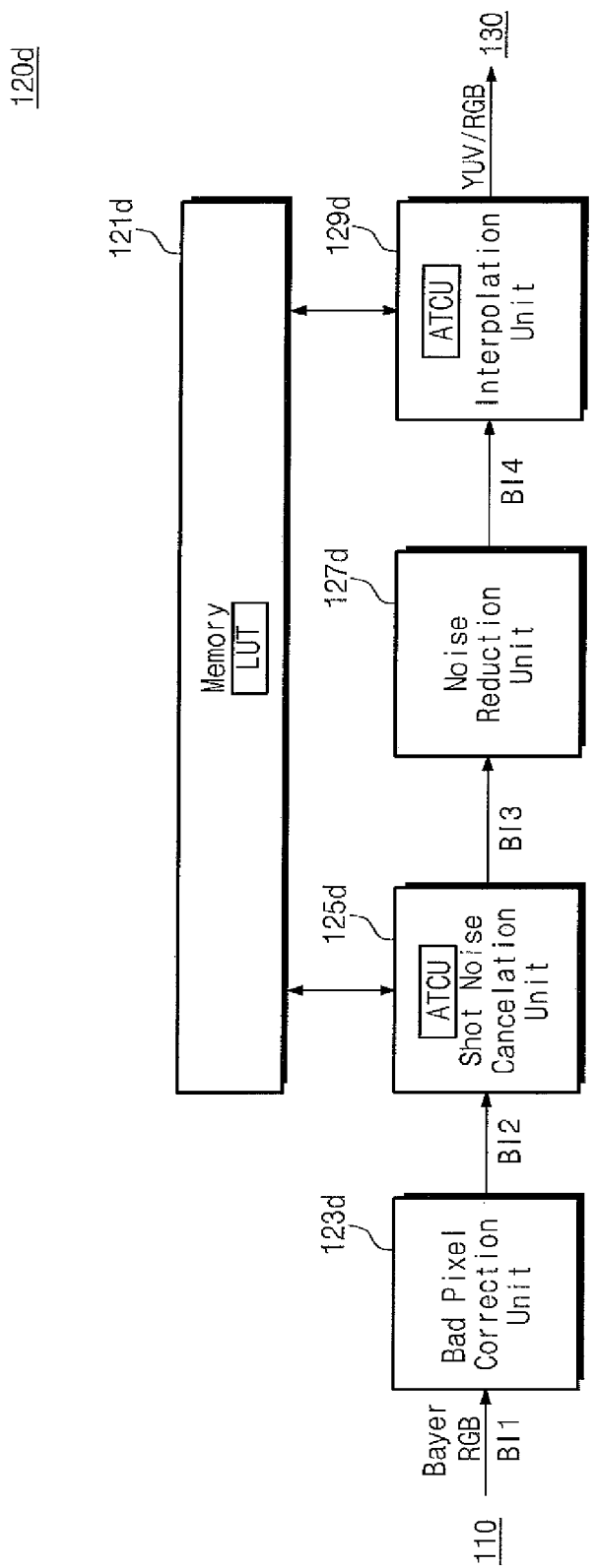
FIG. 10 is a block diagram schematically illustrating an image signal processor according to an exemplary embodiment of the inventive concept.

FIG. 10 is a block diagram schematically illustrating an image signal processor 120d according to an exemplary embodiment of the inventive concept. Referring to FIG. 10, an image signal processor 120d includes a memory 121d, a bad pixel correction unit 123d, a shot noise cancelation unit 125d, a fixed pattern noise reduction unit 127d, and an interpolation unit 129d. Referring to FIG. 10, the interpolation unit 129d includes an adaptive threshold value calculating unit ATCU. The adaptive threshold value calculating unit ATCU may calculate a reference brightness of an image signal, select a variation value of the memory 121d based on the reference brightness, and calculate an adaptive threshold value using the selected variation value. The interpolation unit 129d performs interpolation based on the adaptive threshold value. The shot noise cancelation unit 125d may perform shot noise cancelation as described with reference to FIGS. 2 to 5.

Figure 11:
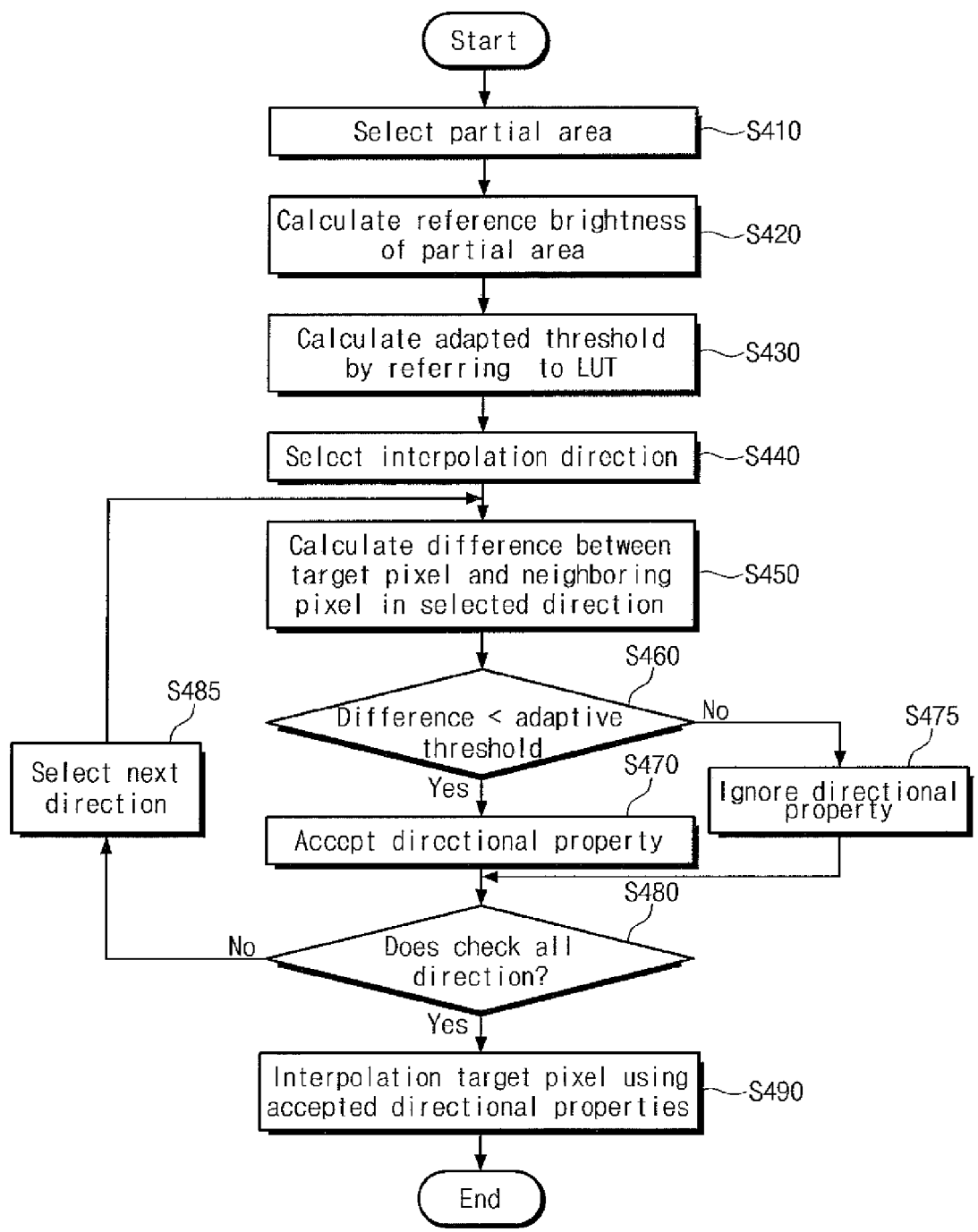
FIG. 11 is a flow chart schematically illustrating an interpolation method according to an exemplary embodiment of the inventive concept.

FIG. 11 is a flow chart schematically illustrating an interpolation method according to an exemplary embodiment of the inventive concept. Referring to FIGS. 4, 10, and 11, an interpolation unit 129d selects a partial area SA of pixels of an image sensor 110 (S410). A size of the partial area SA selected by the interpolation unit 129d may be different from that of a partial area selected by the shot noise cancelation unit 125d.

The interpolation unit 129d calculates a reference brightness I of a fourth Bayer image signal BI4 (S420).

The interpolation unit 129d calculates an adaptive threshold value T2 by referring to a lookup table stored at the memory 121d (S430). Exemplarily, the interpolation unit 129d may select a variation value by referring to the lookup table and calculating a scaling factor based on the selected variation value. The bad pixel correction unit 123b may calculate the adaptive threshold value T2 using the scaled variation value and a predetermined reference threshold value T1. The reference threshold value T1 of the interpolation unit 129d may be different from a reference threshold value of the shot noise cancelation unit 125d.

The interpolation unit 129d selects an interpolation direction (S440). For example, in the selected partial area SA, the interpolation unit 129d may select one of a vertical direction, a horizontal direction, a first diagonal direction from a left top to a right bottom, and a second diagonal direction from a right top to a left bottom on the basis of a target pixel G33.

The interpolation unit 129d calculates a brightness difference between the target pixel G33 and adjacent pixels to the target pixel G33 in the selected interpolation direction (S450).

The interpolation unit 129d compares the calculated difference with the adaptive threshold value T2 (S460). The interpolation unit 129d determines whether the calculated difference is less than the adaptive threshold T2.

If the calculated difference is less than the adaptive threshold value T2, the interpolation unit 129d accepts a directionality property of the selected interpolation direction (S470). If the calculated difference is greater than the adaptive threshold value T2, the interpolation unit 129d ignores the directionality of the selected interpolation direction (S475).

The interpolation unit 129d determines whether all interpolation directions have been checked (S480). If not all the directions have been checked, the interpolation unit 129d selects a next interpolation direction (S485), and the method proceeds to operation S450. If all directions have been checked, the interpolation unit 129d interpolates the target pixel G33 using characteristics of the accepted interpolation direction (e.g., brightness directionalities of pixels).

Figure 12:
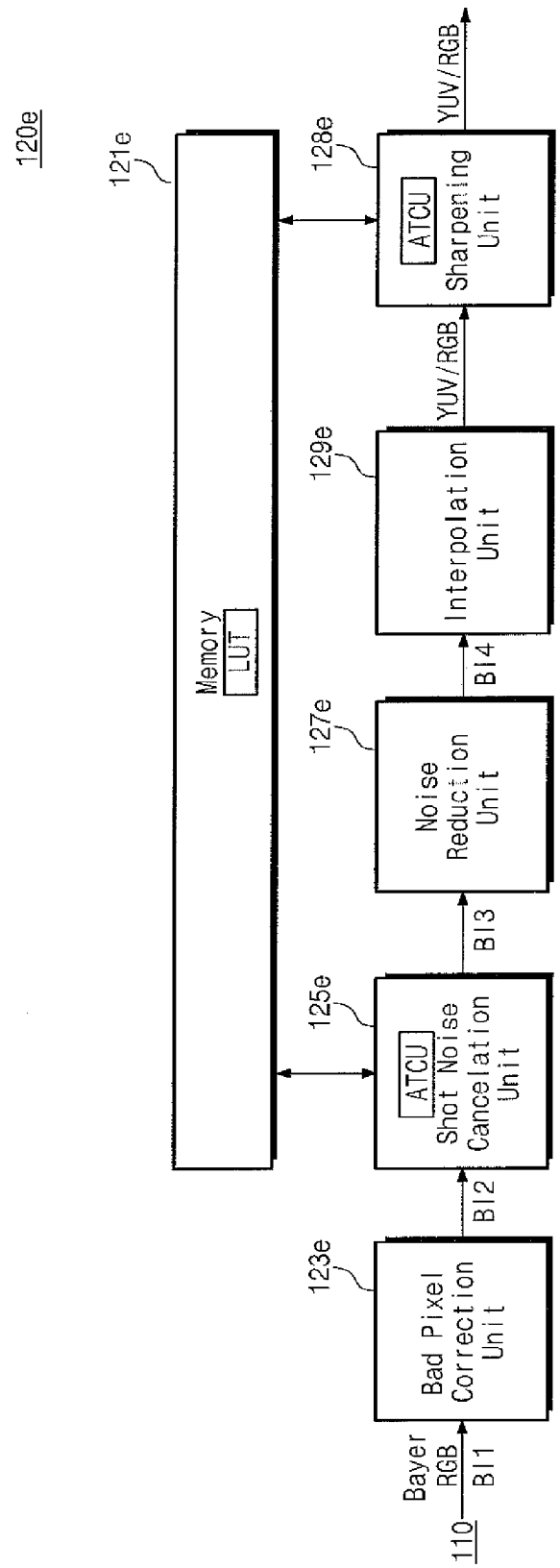
FIG. 12 is a block diagram schematically illustrating an image signal processor according to an exemplary embodiment of the inventive concept.

FIG. 12 is a block diagram schematically illustrating an image signal processor 120e according to an exemplary embodiment of the inventive concept. Referring to FIG. 12, an image signal processor 120e includes a memory 121e, a bad pixel correction unit 123e, a shot noise cancelation unit 125e, a fixed pattern noise reduction unit 127e, an interpolation unit 129e, and a sharpening unit 128e. Referring to FIG. 12, the sharpening unit 128e includes an adaptive threshold value calculating unit ATCU. The adaptive threshold value calculating unit ATCU may calculate a reference brightness of an image signal, select a variation value of the memory 121e based on the reference brightness, and calculate an adaptive threshold value using the selected variation value. The sharpening unit 128e performs sharpening based on the adaptive threshold value. The shot noise cancelation unit 125e may perform shot noise cancelation as described with reference to FIGS. 2 to 5.

Figure 13:
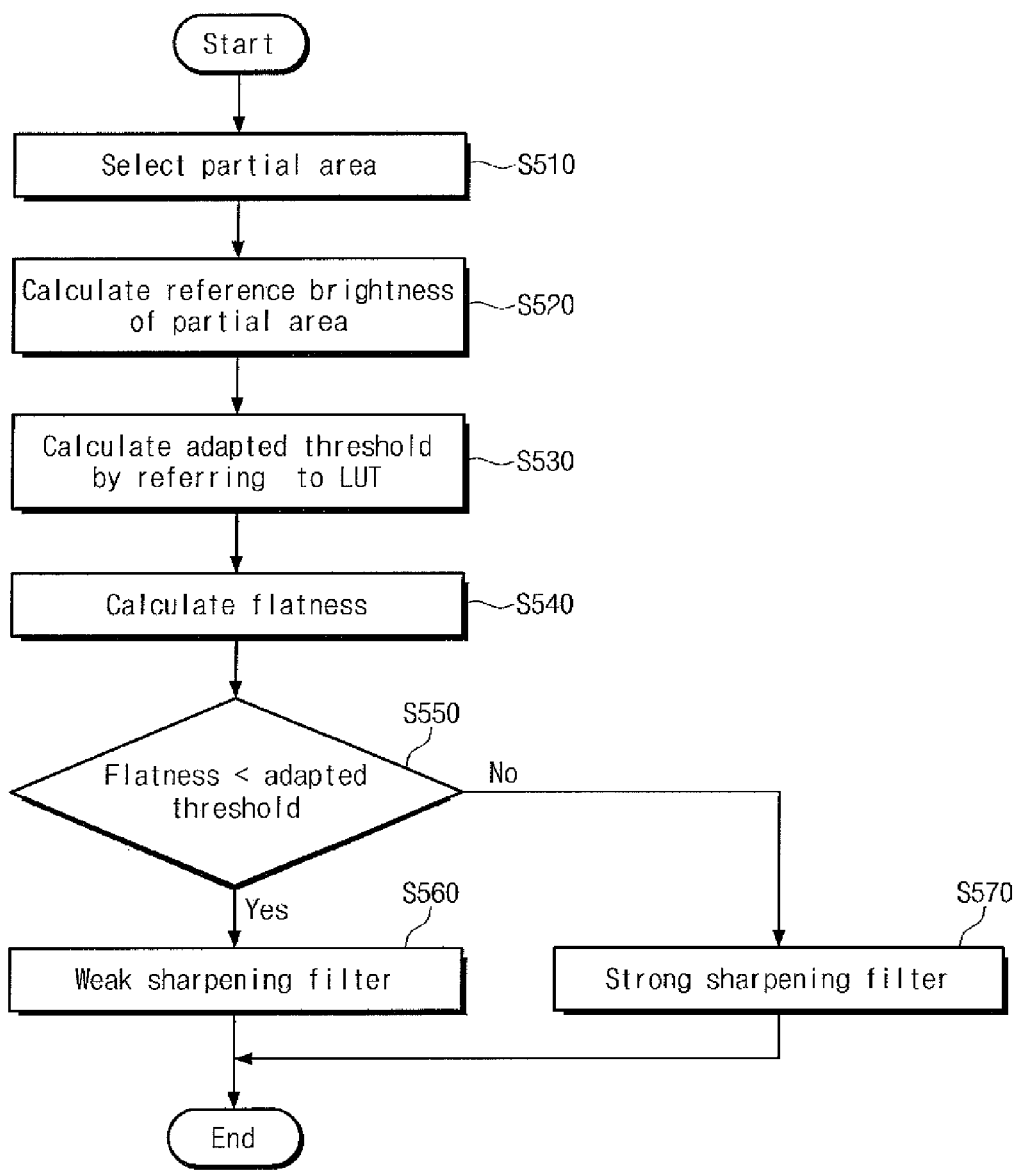
FIG. 13 is a flow chart schematically illustrating a noise reduction method according to an exemplary embodiment of the inventive concept.

FIG. 13 is a flow chart schematically illustrating a noise reduction method according to an exemplary embodiment of the inventive concept. Referring to FIGS. 4, 12, and 13, a sharpening unit 128e selects a partial area SA of pixels of an image sensor 110 (S510). A size of the partial area SA selected by the sharpening unit 128e may be different from that of a partial area selected by the shot noise cancelation unit 125e.

The sharpening unit 128e calculates a reference brightness I of a normal image signal from the interpolation unit 129e (S520).

The sharpening unit 128e calculates an adaptive threshold value T2 by referring to a lookup table stored at the memory 121e (S530). Exemplarily, the sharpening unit 128e may select a variation value by referring to the lookup table and calculate a scaling factor based on the selected variation value. The sharpening unit 128e may calculate the adaptive threshold value T2 using the scaled variation value and a predetermined reference threshold value T1. The reference threshold value T1 of the sharpening unit 128e may be different from a reference threshold value of the shot noise cancelation unit 125e.

The sharpening unit 128e calculates a flatness S of the selected partial area SA (S540). For example, the sharpening unit 128e may calculate the flatness S of the selected partial area SA according to a method described with reference to equation 1.

The sharpening unit 128e compares the calculated flatness S with the adaptive threshold value T2 (S550). The sharpening unit 128e determines whether the flatness S is less than the adapted threshold T2.

If the calculated flatness S is less than the adaptive threshold value T2, the brightness of pixels in the selected partial area SA may be determined to be flat. The sharpening unit 128e applies a weak sharpening filter to the selected partial area SA if the flatness S is less than the adaptive threshold T2 (S560).

If the calculated flatness S is greater than the adaptive threshold value T2, the brightness of pixels in the selected partial area SA may be determined not to be flat. The sharpening unit 128e may apply a strong sharpening filter to the selected partial area SA. The sharpening unit 128e applies a strong sharpening filter to the selected partial area SA if the flatness S is not less than the adaptive threshold T2 (S570).

Figure 14:
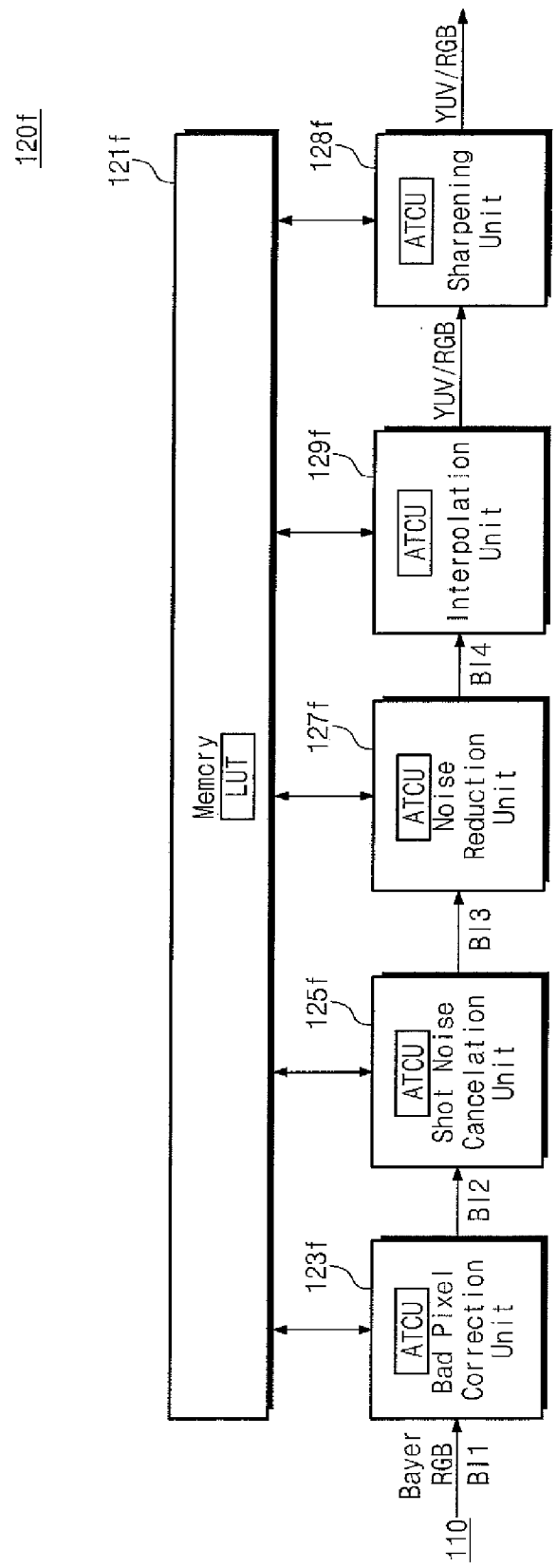
FIG. 14 is a block diagram schematically illustrating an image signal processor according to an exemplary embodiment of the inventive concept.

FIG. 14 is a block diagram schematically illustrating an image signal processor 120f according to an exemplary embodiment of the inventive concept. Referring to FIG. 14, an image signal processor 120f includes a memory 121f, a bad pixel correction unit 123f, a shot noise cancelation unit 125f, a fixed pattern noise reduction unit 127f, an interpolation unit 129f, and a sharpening unit 128f. Referring to FIG. 14, each of the components 123f, 125f, 127f, 129f, and 128f include an adaptive threshold value calculating unit ATCU.

The adaptive threshold value calculating unit ATCU of the bad pixel correction unit 123f may calculate an adaptive threshold value by referring to a lookup table of the memory 121f. The bad pixel correction unit 123f may perform bad pixel correction using the calculated adaptive threshold value.

The shot noise cancelation unit 125f may perform shot noise cancelation according to a method described with reference to FIGS. 3 to 6.

The adaptive threshold value calculating unit ATCU of the fixed pattern noise reduction unit 127f may calculate an adaptive threshold value by referring to a lookup table of the memory 121*f*. The fixed pattern noise reduction unit 127*f* may perform fixed pattern noise reduction using the calculated adaptive threshold value.

The adaptive threshold value calculating unit ATCU of the interpolation unit 129*f* may calculate an adaptive threshold value by referring to a lookup table of the memory 121*f*. The interpolation unit 129*f* performs interpolation using the calculated adaptive threshold value.

The adaptive threshold value calculating unit ATCU of the sharpening unit 128*f* may calculate an adaptive threshold value by referring to a lookup table of the memory 121*f*. The sharpening unit 128*f* performs sharpening using the calculated adaptive threshold value.

Figure 15:
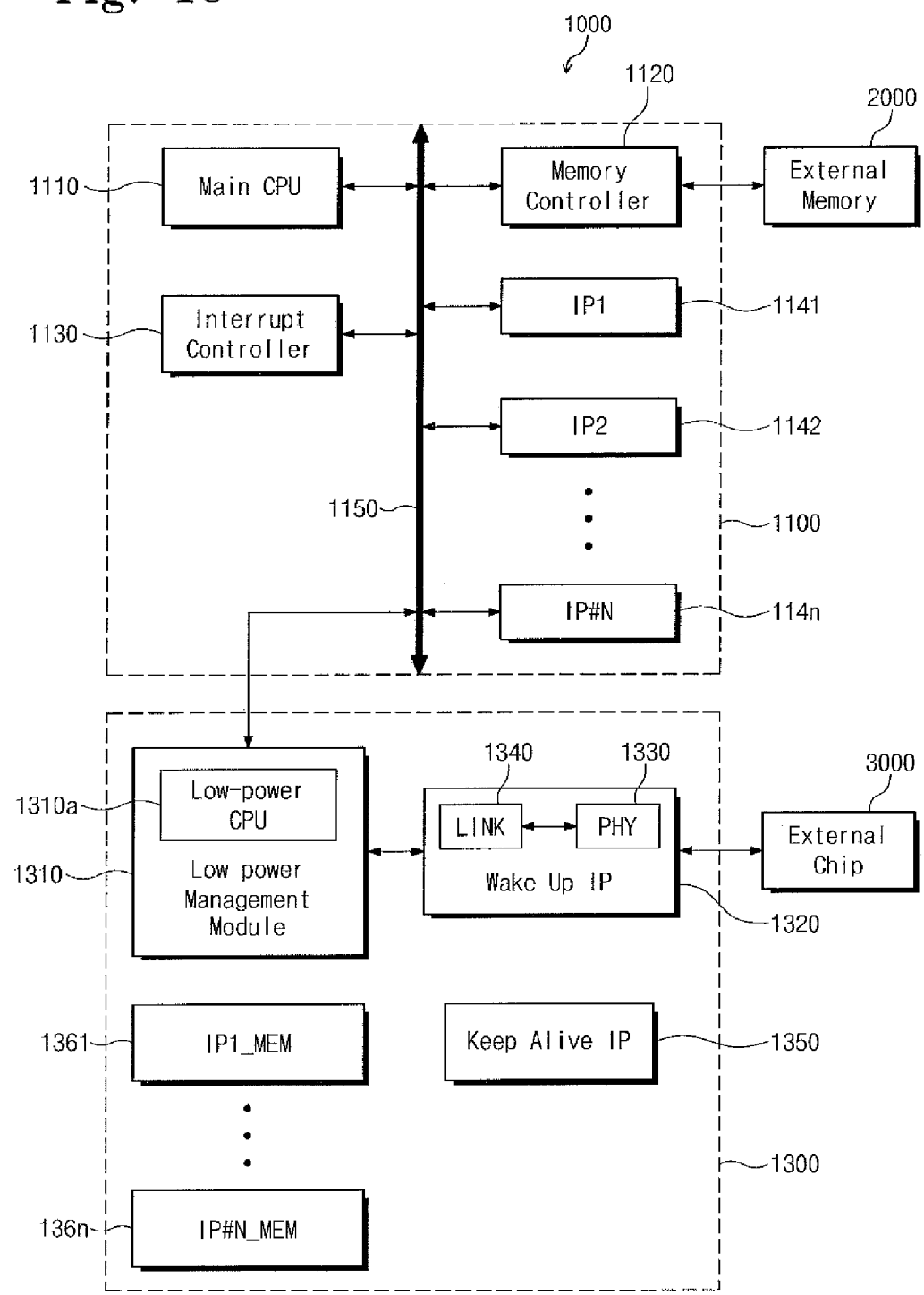
FIG. 15 is a block diagram schematically illustrating a system-on-chip according to an exemplary embodiment of the inventive concept and an external memory and an external chip communicating with the system-on-chip.

FIG. 15 is a block diagram schematically illustrating a system-on-chip 1000 according to an exemplary embodiment of the inventive concept and an external memory 2000 and an external chip 3000 communicating with the system-on-chip 1000. Referring to FIG. 15, a system-on-chip 1000 includes a power-off domain block 1100 and a power-on domain block 1300.

The power-off domain block 1100 may be a block which is powered down to realize a low power of the system-on-chip 1000. The power-on domain block 1300 may be a block which is powered on to perform a part of a function of the power-off domain block 1100 when the power-off domain block 1100 is powered down.

The power-off domain block 1100 includes a main CPU 1110, an interrupt controller 1130, a memory controller 1120, a plurality of intellectual properties (IPs) 1141 to 114*n*, and a system bus 1150. An IP may be a reusable unit of logic, a cell, or a chip layout design that is the intellectual property of one party.

The main CPU 1110 may control the memory controller 1120 to access the external memory 2000. The memory controller 1120 may send data stored at the external memory 2000 to the system bus 1150 in response to a control (e.g., a control signal) of the main CPU 1110.

When an interrupt (e.g., a specific event) is generated from each of the intellectual properties (IPs) 1141 to 114*n*, the interrupt controller 1130 informs the main CPU 1110 of the interrupt. The intellectual properties (IPs) 1141 to 114*n* may perform concrete operations according to a function of the system-on-chip 1000. The intellectual properties (IPs) 1141 to 114*n* may access internal memories 1361 to 136*n*, respectively. The power-on domain block 1300 includes the internal memories 1361 to 136*n* of the intellectual properties (IPs) 1141 to 114*n*.

The power-on domain block 1300 includes a lower-power management module 1310, a wakeup IP 1320, a keep alive IP 1330, and the internal memories 1361 to 136*n* of the intellectual properties (IPs) 1141 to 114*n*.

The lower-power management module 1310 may decide whether to wake-up (e.g., power-on) the power-off domain block 1100 according to data transferred from the wake-up IP 1320. The power-off domain block 1100 is powered off during a standby state where the power-off domain block 1100 waits for an external input. The wake-up may indicate that power is to be applied to the power-off domain block 1100 when external data is provided to the application processor 1000. That is, the wake-up may be an operation that enables the system-on-chip 1000 to enter an operating state (e.g., a power-on state) again.

The wake-up IP 1320 includes a PHY 1330 and a LINK 1340. The wake-up IP 1320 may interface between the low power management module 1310 and an external chip 3000. The PHY 1330 may actually exchange data with the external chip 3000, and the LINK 1340 may transmit and receive data actually exchanged through the PHY 1330 to and from the low power management module 1310 according to a predetermined protocol. The PHY 1330 may be embodied by a semiconductor chip. In an embodiment, the PHY 1330 connects a link layer device (e.g., a Media Access Control device) to a physical medium such as optical fiber or copper cable. In an embodiment, the PHY 1330 includes a physical coding sublayer (PCS) and a physical medium dependent (PMD) layer. The PCS encodes and decodes the data that is transmitted and received.

The keep alive IP 1350 may determine a wake-up operation of the wake-up IP 1320 to activate or deactivate a power of the power-off domain block 1100.

The low power management module 1310 may receive data from at least one of the intellectual properties 1141 to 114*n*. In the event that data not processed is only transferred, the low power management module 1310 may store the input data at an internal memory of a corresponding IP instead of the main CPU 1110.

Internal memories 1361 to 136*n* of the intellectual properties 1141 to 114*n* may be accessed by corresponding intellectual properties during a power-on mode and by the low power management module 1310 during a power-off mode.

At least one of the intellectual properties 1141 to 114*n* may include an image signal processor 120*a*, 120*b*, 120*c*, 120*d* or 120*e* according to an exemplary embodiment of the inventive concept. The intellectual properties 1141 to 114*n* may include a post processor 130. The intellectual properties 1141 to 114*n* may further include a graphic processing unit (GPU), a modem, a sound controller, a security module, and so on.

The system-on-chip 1000 may form an application processor (AP).

Figure 16:
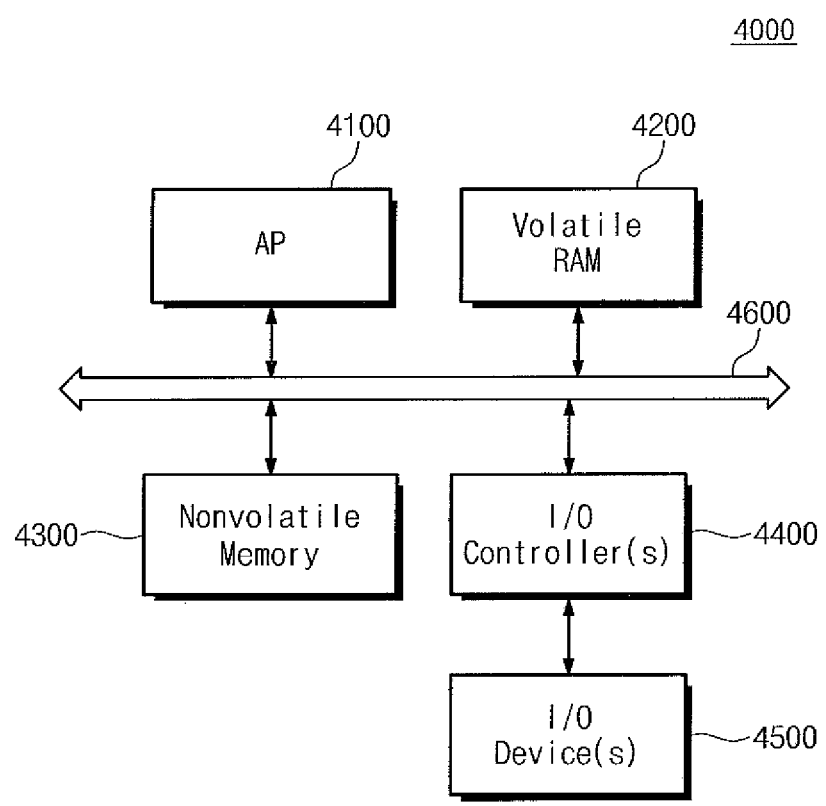
FIG. 16 is a block diagram schematically illustrating a multimedia device according to an exemplary embodiment of the inventive concept.

FIG. 16 is a block diagram schematically illustrating a multimedia device 4000 according to an exemplary embodiment of the inventive concept. Referring to FIG. 16, the multimedia device 4000 includes an application processor 4100, a volatile memory 4200, a nonvolatile memory 4300, one or more input/output controllers 4400, one or more input/output devices 4500, and a bus 4600.

The application processor 4100 may control an overall operation of the multimedia device 4000. The application processor 4100 may be formed in a system-on-chip form. The application processor 4100 may include a system-on-chip 1000 described with reference to FIG. 14. The application processor 4100 may include at least one of image signal processors 120*a*, 120*b*, 120*c*, 120*d*, and 120*e* or a combination of at least two thereof. The application processor 4100 may further comprise a graphic processing unit (GPU), a sound controller, a security module, and so on. The application processor 4100 may further comprise a modem.

The volatile memory 4200 may be a working memory of the multimedia device 4000. The volatile memory 4200 may include a DRAM (Dynamic Random Access Memory) or an SRAM (Static Random Access Memory).

The nonvolatile memory 4300 may be used as a main storage unit of the multimedia device 4000. The nonvolatile memory 4300 may include a nonvolatile storage device such as a flash memory, a hard disk drive, a solid state drive, or the like.

The one or more input/output controllers 4400 may be configured to control the one or more input/output devices 4500.

The one or more input/output devices 4500 may include devices receiving signals from an external device. The one or more input/output devices 4500 may include a keyboard, a key pad, a button, a touch panel, a touch screen, a touch pad, a touch ball, a camera including an image sensor, a microphone, a Gyroscope sensor, a vibration sensor, a data port for a wire input, an antenna for a wireless input, and so on.

The one or more input/output devices 4500 may include devices outputting signals to an external device. The one or more input/output devices 4500 may include an LCD (Liquid Crystal Display), an OLED (Organic Light Emitting Diode) display device, an AMOLED (Active Matrix OLED) display device, an LED, a speaker, a motor, a data port for a wire output, an antenna for a wireless output, and so on.

The multimedia device 4000 may capture a target image and perform an integral operation by units of columns based on the captured image. The multimedia device 4000 may track a target using various pictures and track poise, mood, and feeling of the target.

The multimedia device 4000 may be a mobile multimedia device or a mobile device such as a smart phone, a smart pad, a digital camera, a digital camcorder, a notebook computer, and so on or a stationary multimedia device such as a smart television, a desktop computer, and so on.

In an exemplary embodiment, an interpolation operation performed by at least one of the above-described interpolation units attempts to achieve a best approximation of a pixel's color and intensity based on the values at surrounding pixels. Interpolation techniques may be divided into adaptive and non-adaptive interpolation methods. Non-adaptive interpolation methods may include nearest neighbor, bilinear, bicubic, spline, sinc, lanczos, etc. Adaptive interpolation methods may include Oimage, PhotoZoom Pro, Genuine Fractals, etc.

At least one embodiment of the inventive concept can be embodied as computer-readable codes having computer executable instructions on a computer-readable medium. For example, the operations of FIG. 5, FIG. 7A, FIG. 7B, FIG. 9, FIG. 11, and FIG. 13 may be embodied as computer executable instructions. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices.

While the inventive concept has been described with reference exemplary embodiments thereof, modifications may be made to these embodiments without departing from the spirit and scope of the present invention. Therefore, it should be understood that the inventive concept is not limited to the above-described exemplary embodiments.

What is claimed is:

1. A processor configured to receive a Bayer image signal from an image sensor and convert the Bayer image signal into a normal image signal, the processor comprising:
    an image signal processor comprising a memory configured to store a table including reference brightness values and variation values according to the reference brightness values, wherein the image signal processor is configured to calculate a reference brightness value from the Bayer image signal, select a variation value in the table of the memory according to the calculated reference brightness value, perform shot noise canceling on the Bayer image signal based on the selected variation value to generate a modified Bayer image signal and generate a normal image signal by performing interpolation based on the modified Bayer image signal,
    wherein the image signal processor performs the shot noise cancelling by applying one of a strong low pass filter and a weak low pass filter to the Bayer image signal;
    wherein the image signal processor is further configured to calculate an adaptive threshold value using a reference threshold value and the selected variation value and to perform the shot noise cancelling on the Bayer image signal based on the adaptive threshold value;
    wherein the image signal processor is further configured to calculate a flatness of the Bayer image signal, to compare the flatness with the adaptive threshold value, and to perform the shot noise cancelling on the Bayer image signal based on the comparison result.

2. The processor of claim 1, wherein the image signal processor is further configured to apply the strong low pass filter to the Bayer image signal when the flatness is less than the adaptive threshold value and the weak low pass filter to the Bayer image signal when the flatness is greater than the adaptive threshold value.

3. The processor of claim 1, wherein the image signal processor is configured to receive the Bayer image signal from the image sensor, to perform a correction on a pixel of the Bayer image signal to generate a corrected Bayer image signal, to calculate a reference brightness value of the Bayer image signal, to select a variation value from the table of the memory according to the reference brightness value, and to perform the correction based on the selected variation value.

4. The processor of claim 3, wherein the image signal processor is further configured to calculate a difference between a brightness value of a target pixel with the reference brightness value, to compare the difference with the adaptive threshold value, and to perform the correction by determining the target pixel to have an error when the difference is less than the adaptive threshold value and the target pixel to be a normal pixel when the difference is greater than the adaptive threshold value.

5. The processor of claim 3, wherein the image signal processor is configured to calculate brightness distributions according to directions of adjacent pixels to a target pixel, to compare the adaptive threshold value and the calculated brightness distributions, to select brightness distributions for correcting the target pixel according to the comparison result, and to correct the target pixel using the selected brightness distributions.

6. The processor of claim 1,
    wherein the image signal processor is configured to perform fixed pattern noise reduction on the modified Bayer image signal to generate a second modified Bayer image signal,
    wherein the image signal processor is configured to calculate a reference brightness value of the second modified Bayer image signal, to select a variation value from the table of the memory according to the reference brightness value, and to perform the fixed pattern noise reduction based on the selected variation value.

7. The processor of claim 6, wherein the image signal processor is further configured to calculate the adaptive threshold value by adding a reference threshold value and the selected variation value, to calculate a brightness difference according to a pattern to be removed from the second modified Bayer image signal, to compare the brightness difference with the adaptive threshold value, and to perform strong fixed pattern noise reduction on the second modified Bayer image signal when the brightness difference is less than the adaptive threshold value and weak fixed pattern noise reduction on the second modified Bayer image signal when the brightness difference is greater than the adaptive threshold value.

8. The processor of claim 1, wherein the image signal processor is configured to calculate a reference brightness value from the modified Bayer image signal, to select a variation value from the table of the memory according to the reference brightness value, and to perform interpolation on the modified Bayer image signal based on the selected variation value.

9. The processor of claim 8, wherein the image signal processor is further configured to select a first interpolation direction, to calculate a brightness difference between a center pixel of the first interpolation direction and adjacent pixels to the center pixel, to compare the calculated difference with the adaptive threshold value, and to accept a directionality of a brightness variation of the first interpolation direction when the calculated difference is less than the adaptive threshold value or ignore a directionality of a brightness variation of the first interpolation direction when the calculated difference is greater than the adaptive threshold value.

10. The processor of claim 9,
wherein the image signal processor is further configured to select a second interpolation direction, to calculate the brightness difference on the second interpolation direction, to compare the calculated difference with the adaptive threshold value, and to accept or ignore a directionality of a brightness variation of the second interpolation direction,
wherein the image signal processor is further configured to decide a final direction by combing directionalities accepted in the first and second interpolation directions and to perform interpolation according to the decided directionality.

11. The processor of claim 1,
wherein the image signal processor is configured to perform sharpening on the normal image signal,
wherein the image signal processor is further configured to calculate a reference brightness value from the normal image signal, to select a variation value from the table of the memory according to the reference brightness value, and to perform the sharpening based on the selected variation value.

12. The processor of claim 11, wherein the image signal processor is further configured to calculate a weighted sum on a brightness difference between a center pixel and adjacent pixels to the center pixel, to compare the calculated weighted sum with the adaptive threshold value, and to apply a weak sharpening filter to the normal image signal when the calculated weighted sum is less than the adaptive threshold value and a strong sharpening filter to the normal image signal when the calculated weighted sum is greater than the adaptive threshold value.

13. A mobile device comprising:
an image sensor configured to capture a target image to output a Bayer image signal;
an image signal processor configured to receive the Bayer image signal from the image sensor and convert the Bayer image signal into a normal image signal; and
a post processor configured to perform image correction on the normal image signal provided from the image signal processor,
wherein the image signal processor comprises: a memory configured to store a table including reference brightness values and variation values according to the reference brightness values;
wherein the image signal processor is configured to calculate a reference brightness value of the Bayer image signal, select a variation value in the table of the memory according to the calculated reference brightness value, and perform shot noise cancelling on the Bayer image signal based on the selected variation value to generate a modified Bayer image signal, and
wherein the image signal processor is configured to generate the normal image signal by performing interpolation based on the modified Bayer image signal,
wherein the image signal processor performs the shot noise cancelling by applying one of a strong low pass filter and a weak low pass filter to the Bayer image signal;
wherein the image signal processor noise reduction unit is further configured to calculate an adaptive threshold value using a reference threshold value and the selected variation value and to perform the shot noise cancelling on the Bayer image signal based on the adaptive threshold value;
wherein the image signal processor is further configured to calculate a flatness of the Bayer image signal, to compare the flatness with the adaptive threshold value, and to perform the shot noise cancelling on the Bayer image signal based on the comparison result.

* * * * *